(12) United States Patent
Cheng

(10) Patent No.: US 12,251,772 B2
(45) Date of Patent: Mar. 18, 2025

(54) METHOD FOR SOLID STATE WELDING

(71) Applicant: Paul Po Cheng, London (CA)

(72) Inventor: Paul Po Cheng, London (CA)

( * ) Notice: Subject to any disclaimer, the term of this patent is extended or adjusted under 35 U.S.C. 154(b) by 122 days.

(21) Appl. No.: 18/178,592

(22) Filed: Mar. 6, 2023

(65) Prior Publication Data

US 2023/0201954 A1    Jun. 29, 2023

Related U.S. Application Data

(63) Continuation-in-part of application No. 16/821,104, filed on Mar. 17, 2020, now Pat. No. 11,597,032.

(51) Int. Cl.
| | |
|---|---|
| *B23K 20/00* | (2006.01) |
| *B23K 20/12* | (2006.01) |
| *B23K 20/14* | (2006.01) |
| *B23K 20/16* | (2006.01) |
| *B23K 101/10* | (2006.01) |

(52) U.S. Cl.
CPC ............ *B23K 20/14* (2013.01); *B23K 20/123* (2013.01); *B23K 20/129* (2013.01); *B23K 20/16* (2013.01); *B23K 2101/10* (2018.08)

(58) Field of Classification Search
CPC .. B23K 20/1205; B23K 20/129; B23K 20/26; B23K 2101/06; B23K 2101/10; B23K 13/015
See application file for complete search history.

(56) References Cited

U.S. PATENT DOCUMENTS

| | | | |
|---|---|---|---|
| 4,103,815 A | 8/1978 | Yokokawa et al. | |
| 4,555,053 A | 11/1985 | Persson et al. | |
| 5,208,443 A | 5/1993 | McGaffigan | |
| 5,240,167 A * | 8/1993 | Ferte | B23K 20/129 228/114.5 |
| 5,699,955 A | 12/1997 | Shimizu et al. | |
| 5,785,805 A | 7/1998 | Fix, Jr. | |
| 5,831,252 A | 11/1998 | Shimizu | |
| 6,199,746 B1 * | 3/2001 | Dupree | F01D 5/005 228/119 |

(Continued)

FOREIGN PATENT DOCUMENTS

CN    1976777 A    6/2007

OTHER PUBLICATIONS

European Search Report for the corresponding EP Application No. 21772120.8 dated Apr. 2, 2024.

*Primary Examiner* — Erin B Saad

(57) ABSTRACT

A method of securing an insert in a preselected region of a workpiece. An opening wall is formed in the workpiece with an opening wall surface defining an opening to produce a remainder segment of the workpiece. The opening encompasses or coincides with the preselected region. An insert is provided to fit in the opening. An insert heated portion and a remainder segment heated portion are heated to a hot working temperature, at which they are plastically deformable. While the insert is subjected to an engagement motion, to move the insert relative to the remainder segment, an insert engagement surface of the insert is pressed against the opening wall surface, for plastic deformation of the insert heated portion and of the remainder segment heated portion, creating a metallic bond between the insert and the remainder segment. The insert and the remainder segment are allowed to cool, to bond them together.

5 Claims, 41 Drawing Sheets

(56) References Cited

U.S. PATENT DOCUMENTS

| | | | |
|---|---|---|---|
| 6,454,156 B1 * | 9/2002 | Taras, Jr. | F01D 5/18 |
| | | | 228/119 |
| 6,637,642 B1 | 10/2003 | Lingnau | |
| 7,086,960 B2 | 8/2006 | Huang et al. | |
| 7,348,523 B2 | 3/2008 | Slack et al. | |
| 7,600,666 B2 | 10/2009 | Rabinovich | |
| 7,752,728 B2 | 7/2010 | Schedler et al. | |
| 7,759,597 B2 * | 7/2010 | Bibo | B23K 33/006 |
| | | | 219/112 |
| 7,931,184 B2 | 4/2011 | Lingnau et al. | |
| 8,336,755 B2 | 12/2012 | Bray et al. | |
| 8,863,371 B2 | 10/2014 | Brouwer et al. | |
| 8,998,067 B2 * | 4/2015 | Lehr | B23K 20/129 |
| | | | 228/2.1 |
| 9,644,769 B1 | 5/2017 | Cheng | |
| 10,288,193 B2 | 5/2019 | Cheng | |
| 11,413,699 B2 * | 8/2022 | Cheng | F16L 13/02 |
| 11,577,295 B2 * | 2/2023 | Cheng | B23K 13/015 |
| 11,597,032 B2 * | 3/2023 | Cheng | B23K 20/002 |
| 11,717,911 B1 * | 8/2023 | Cheng | B23K 20/002 |
| | | | 228/219 |
| 2004/0200883 A1 * | 10/2004 | Staheli | B29C 66/1222 |
| | | | 228/114.5 |
| 2009/0242613 A1 * | 10/2009 | Kawaura | B23K 13/015 |
| | | | 228/2.1 |
| 2010/0108666 A1 | 5/2010 | Gafri et al. | |
| 2011/0284523 A1 | 11/2011 | Hiroyama et al. | |
| 2014/0191016 A1 * | 7/2014 | Lehr | B23K 20/1205 |
| | | | 228/114.5 |

\* cited by examiner

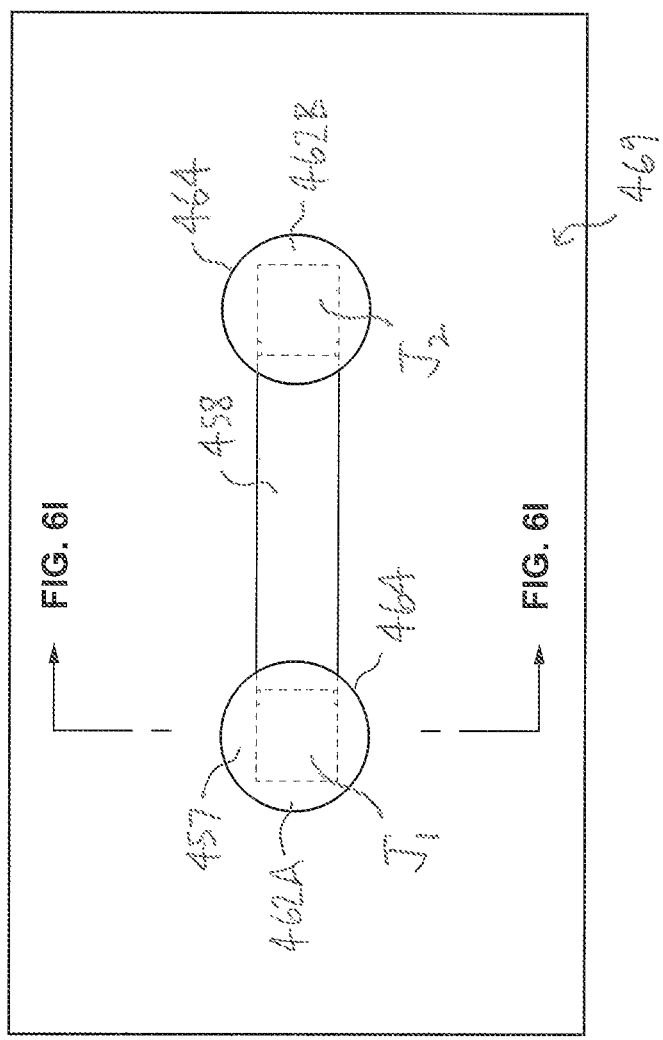

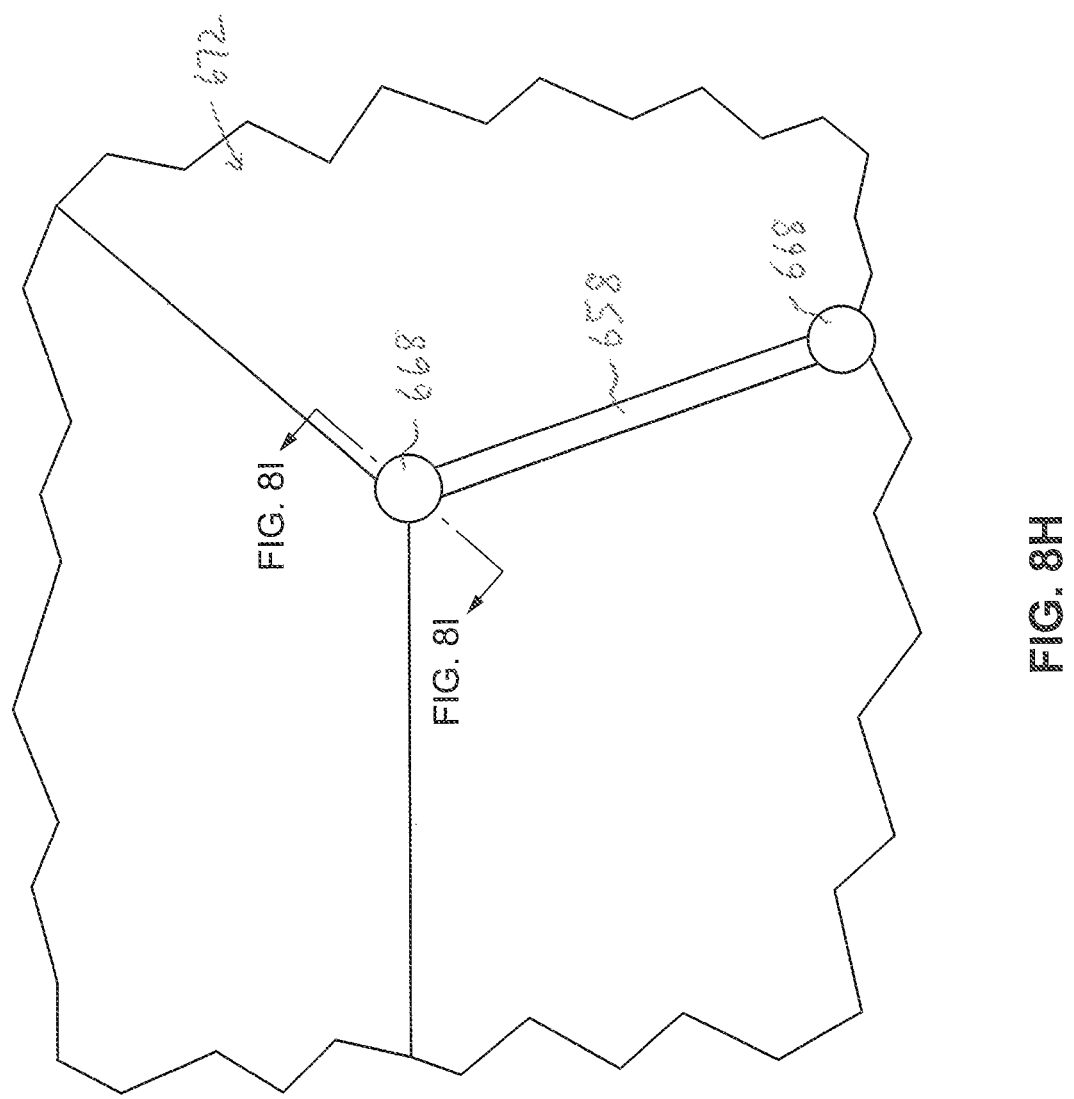

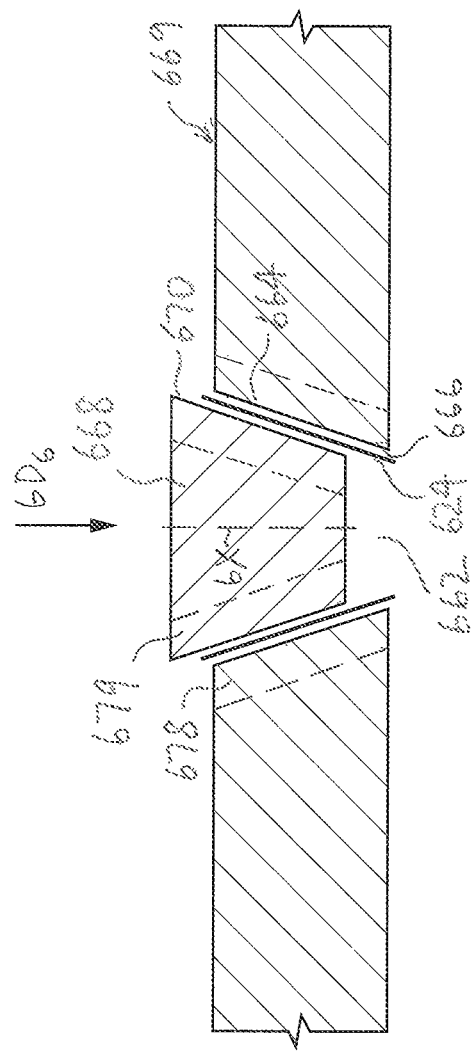
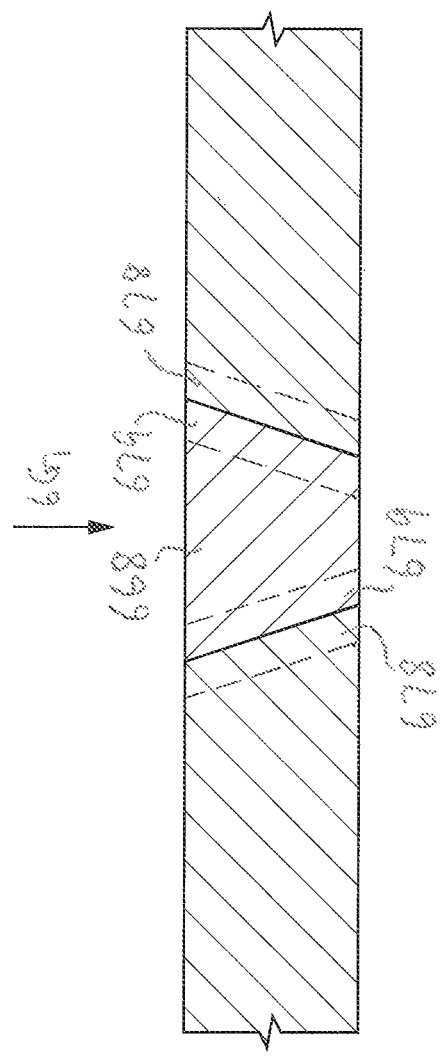
FIG. 8I
FIG. 8J

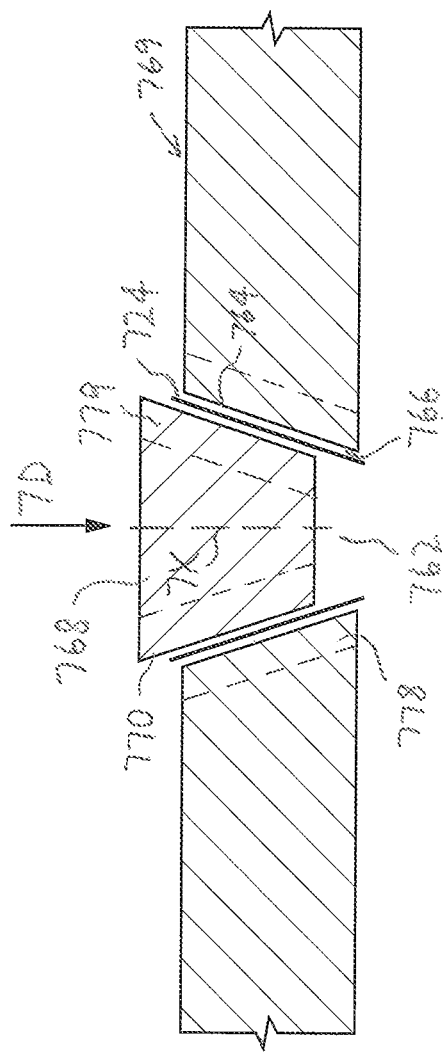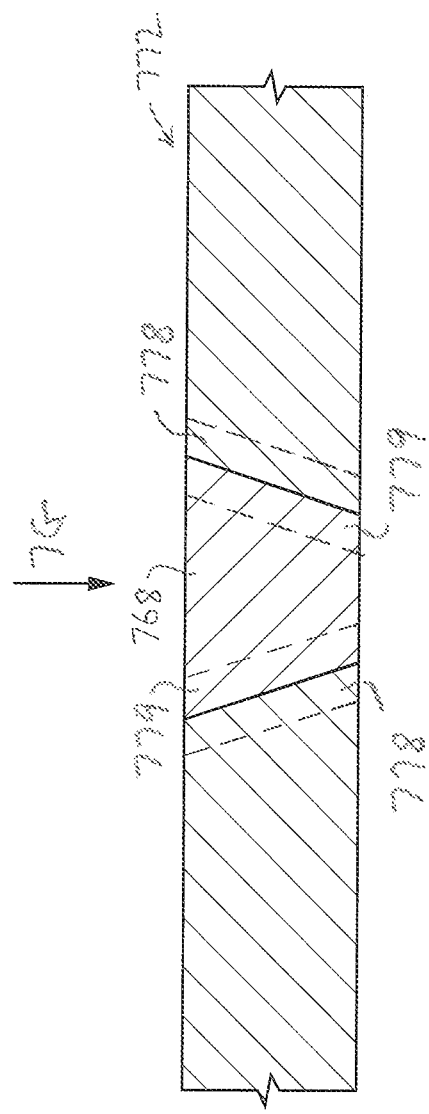

US 12,251,772 B2

METHOD FOR SOLID STATE WELDING

CROSS-REFERENCE TO RELATED APPLICATIONS

This application is a continuation-in-part of U.S. patent application Ser. No. 16/821,104, filed on Mar. 17, 2020, the entirety of which is hereby incorporated herein by reference.

FIELD OF THE INVENTION

The present invention is a method for solid state welding.

BACKGROUND OF THE INVENTION

In the prior art, a tube or pipe 10 of the prior art may be formed so that it includes a longitudinal opening 12 along its length (FIGS. 1A, 1B). The tube or pipe 10 may be formed by bending a relatively thick piece of steel, leaving the opening 12 along its length. The known methods for filling the opening typically result in a "heat-affected zone" (not shown) along the edges of the longitudinal opening 12 (FIGS. 1A, 1B). As is known, the heat-affected zone is an undesirable consequence, as the heat-affected zone is a generally weakened part of the tube.

In FIG. 1C, a partially cut-away view of a damaged tube or pipe 10' of the prior art is illustrated. (As will be described, embodiments of the invention are illustrated in the balance of the attached drawings.) The tube or workpiece may be subjected to various types of damage. In the example illustrated, a girth crack or opening "$C_1$" (i.e., at least partially radial) and an elongate generally axial crack or opening "$C_2$" (i.e., at least partially parallel to the longitudinal axis of the tube 10') have been formed in the tube 10'. However, the known methods of filling these cracks or openings would have the disadvantage that heat-affected zones would be created in the tube 10', which would weaken the tube 10'.

Solid state welding, in which one of two heated metal tubes is rotated when the tubes are engaged to weld the tubes together end-to-end, is disclosed in U.S. Pat. No. 6,637,642. Among its benefits, solid state welding may achieve a weld without creating heat-affected zones in the tubes that are joined together using this technique. The ends of the tubes form a metallic bond, with a relatively uniform crystalline structure. However, solid state welding requires the application of substantial heat and force, and has not been utilized in repairing or otherwise modifying metal workpieces having a variety of configurations.

SUMMARY OF THE INVENTION

For the foregoing reasons, there is a need for a method and a system for solid state welding that overcome or mitigate one or more of the deficiencies or disadvantages of the prior art.

In its broad aspect, the invention provides a method of securing an insert in a preselected region of a workpiece. An opening wall is formed in the workpiece with an opening wall surface defining an opening to produce a remainder segment of the workpiece. The opening encompasses or coincides with the preselected region. An insert is provided to fit in the opening. An insert heated portion and a remainder segment heated portion are heated to a hot working temperature, at which they are plastically deformable. While the insert is subjected to an engagement motion, to move the insert relative to the remainder segment, an insert engagement surface of the insert is pressed against the opening wall surface, for plastic deformation of the insert heated portion and of the remainder segment heated portion, creating a metallic bond between the insert and the remainder segment. The insert and the remainder segment are allowed to cool, to bond the insert and the remainder segment together.

BRIEF DESCRIPTION OF THE DRAWINGS

The invention will be better understood with reference to the attached drawings, in which:

FIG. 6H is a plan view of a residual segment of the incomplete workpiece of FIG. 6D with supplementary openings formed therein, drawn at a smaller scale;

FIG. 6I is a cross-section of the residual segment of FIG. 6H with a plug positioned for insertion thereof into a supplementary opening, drawn at a larger scale;

FIG. 8H is a top view of the residual segment of FIG. 8G in which plugs are positioned in the respective supplementary openings;

FIG. 8I is a cross-section of one of the plugs of FIG. 8H positioned to be inserted into one of the supplementary openings, drawn at a larger scale;

FIG. 8J is a cross-section of the plug of FIG. 8I in which the plug is positioned in the supplementary opening therefor;

FIG. 9F is a cross-section of one of the plugs of FIG. 9E, positioned for insertion into the supplementary opening, drawn at a larger scale; and FIG. 9G is a cross-section of the plug of FIG. 9F located in the supplementary opening.

DETAILED DESCRIPTION

Figure 1A:
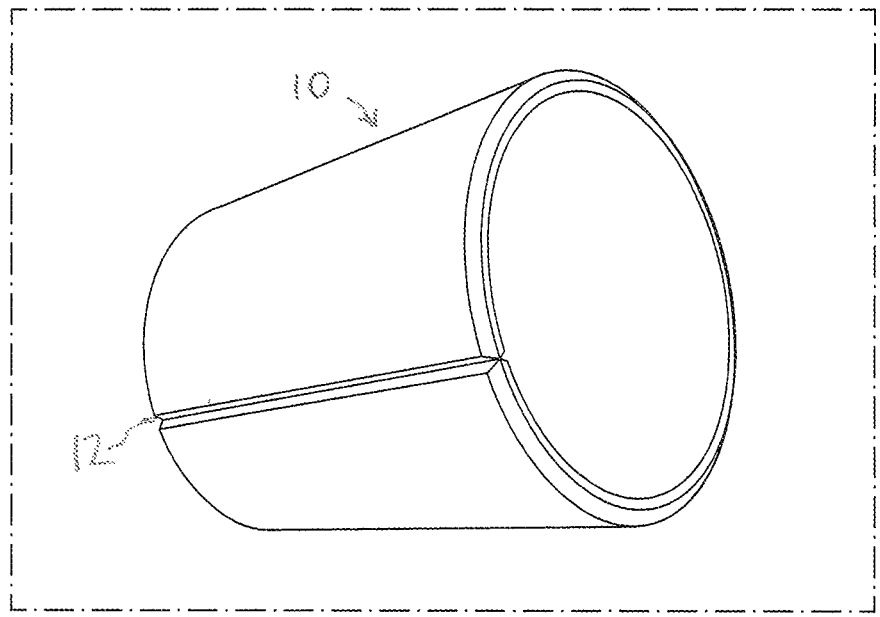
FIG. 1A (also described previously) is an isometric view of a metal tube of the prior art formed with a longitudinal gap therein.
Figure 1B:
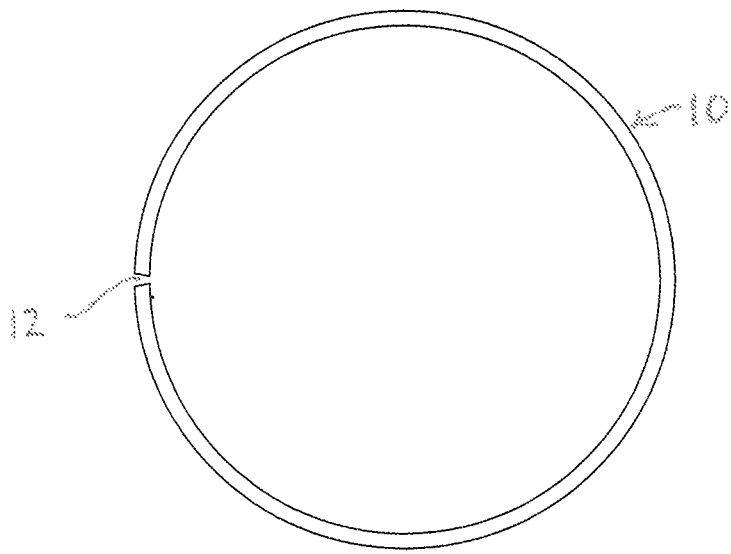
FIG. 1B (also described previously) is a cross-section of the tube of FIG. 1A, drawn at a larger scale.
Figure 1C:
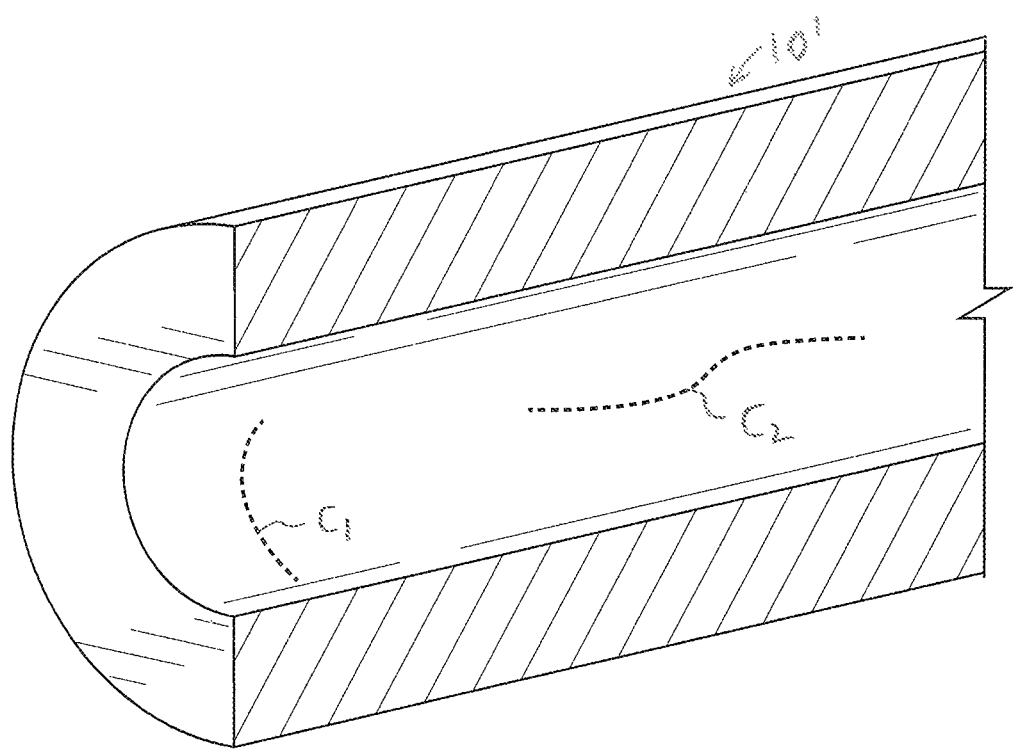
FIG. 1C (also described previously) is a partial isometric view of another metal tube of the prior art including one or more openings or cracks formed therein, drawn at a smaller scale.

In the attached drawings, like reference numerals designate corresponding elements throughout. In particular, to simplify the description, the reference numerals used in FIGS. 1A-1C are used again in connection with the description of the invention hereinafter, except that each such reference numeral is raised by 100 (or by whole number multiples thereof, as the case may be), where the elements correspond to elements illustrated in FIGS. 1A-1C.

Reference is first made to FIGS. 2A-3I to describe an embodiment of a method in accordance with the invention for at least partially filling one or more openings 112 in a workpiece 110 made of a metal. As can be seen, for instance, in FIG. 3G, the opening 112 is at least partially defined by one or more opening walls 116 having one or more opening wall surfaces 118. In one embodiment, the method preferably includes providing an insert 120 including an insert material that is metallically bondable with the metal. Those skilled in the art would also be aware of materials that are metallically bondable with each other.

As will be described, the insert 120 preferably is formed to at least partially fit into the opening 112. It is preferred that the insert 120 has one or more insert engagement surfaces 122 (FIG. 3G) that are formed for engagement with the opening wall surface(s) 118.

Preferably, the opening wall surface 118 is heated in a first non-oxidizing atmosphere to a hot working temperature. As will also be described, when the opening wall surface 118 is heated to the hot working temperature, the opening wall surface 118 is plastically deformable. It is also preferred that the insert engagement surface 122 is heated in a second non-oxidizing atmosphere to the hot working temperature. When the insert engagement surface 122 is also heated to the hot working temperature, the insert engagement surface 122 is also plastically deformable.

The hot working temperature is below the metal's melting temperature. It will be understood that the "hot working temperature", for the purposes hereof, may in fact be a range of temperatures. Those skilled in the art would be aware of suitable hot working temperatures for any particular metals, and suitable non-oxidizing atmospheres therefor.

Preferably, the insert 120 is subjected to an engagement motion, to move the insert engagement surface(s) 122 relative to the opening wall surface(s) 118. As will be described, the engagement motion may be as oscillating or vibrating motion. While the insert 120 is subjected to the engagement motion, and while the insert engagement surface 122 and the opening wall surface 118 are at the hot working temperature, the insert 120 preferably is also subjected to a translocation motion, to move the insert 120 at least partially into the opening 112, to engage the insert engagement surface(s) 122 with the opening wall surface(s) 118.

As will also be described, the insert 120 preferably is simultaneously subjected to both the engagement motion and the translocation motion, to engage the moving insert engagement surface(s) 122 with the opening wall surface(s) 118, to cause plastic deformation of the opening wall surface(s) 118 and of the insert engagement surface(s) 122 as they engage each other, for at least partially creating a metallic bond between the insert 120 and the workpiece 110. Finally, the insert 120 and the workpiece 110 are allowed to cool, to solidify the insert 120 and the workpiece 110 together.

Those skilled in the art would be aware that the opening wall surface(s) 118 and the insert engagement surface(s) 122 should be suitably prepared (e.g., cleaned) prior to their heating and subsequent engagement. Those skilled in the art would also be aware of suitable surface preparation techniques.

Figure 2A:
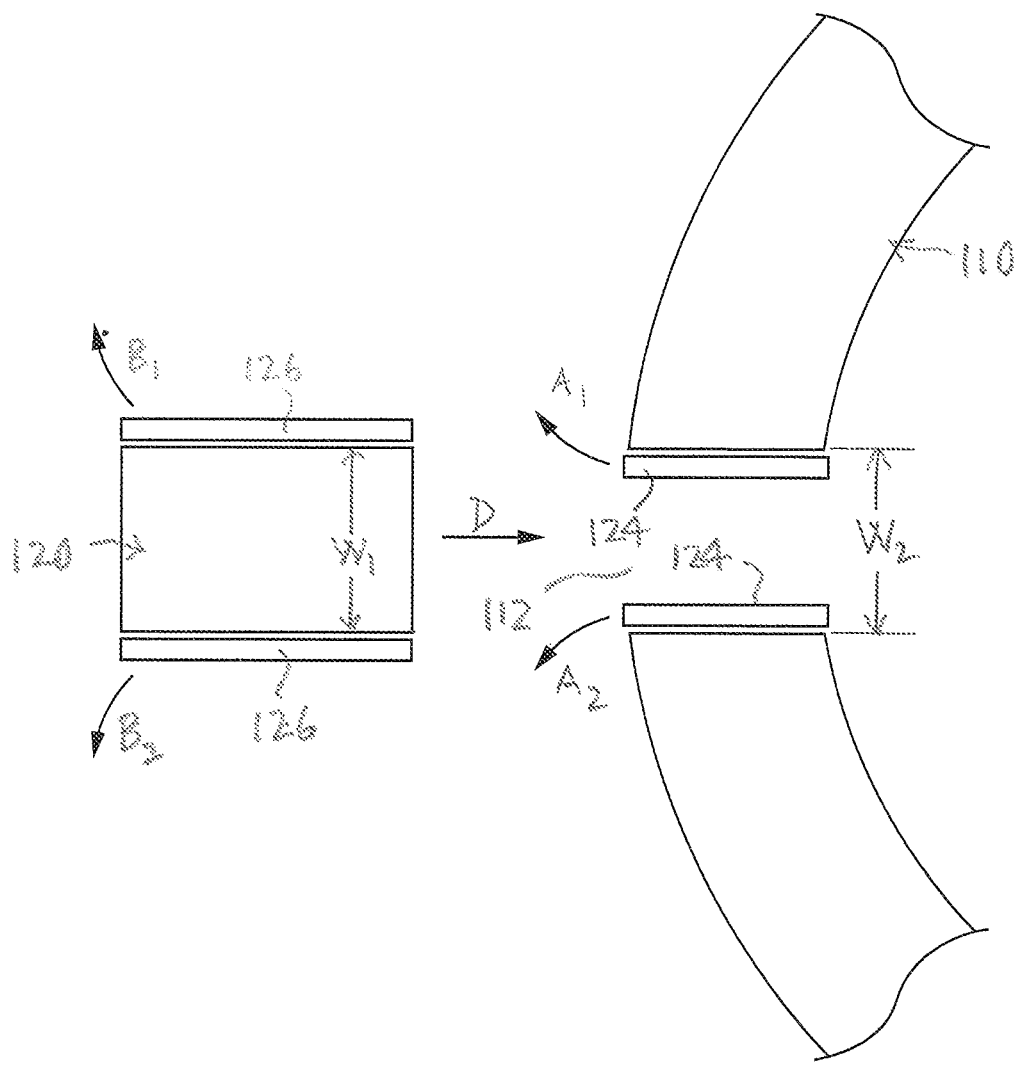
FIG. 2A is a cross-section of an embodiment of an insert of the invention and other elements prior to translocation of the insert into an opening in a metal workpiece, drawn at a larger scale.
Figure 3A:
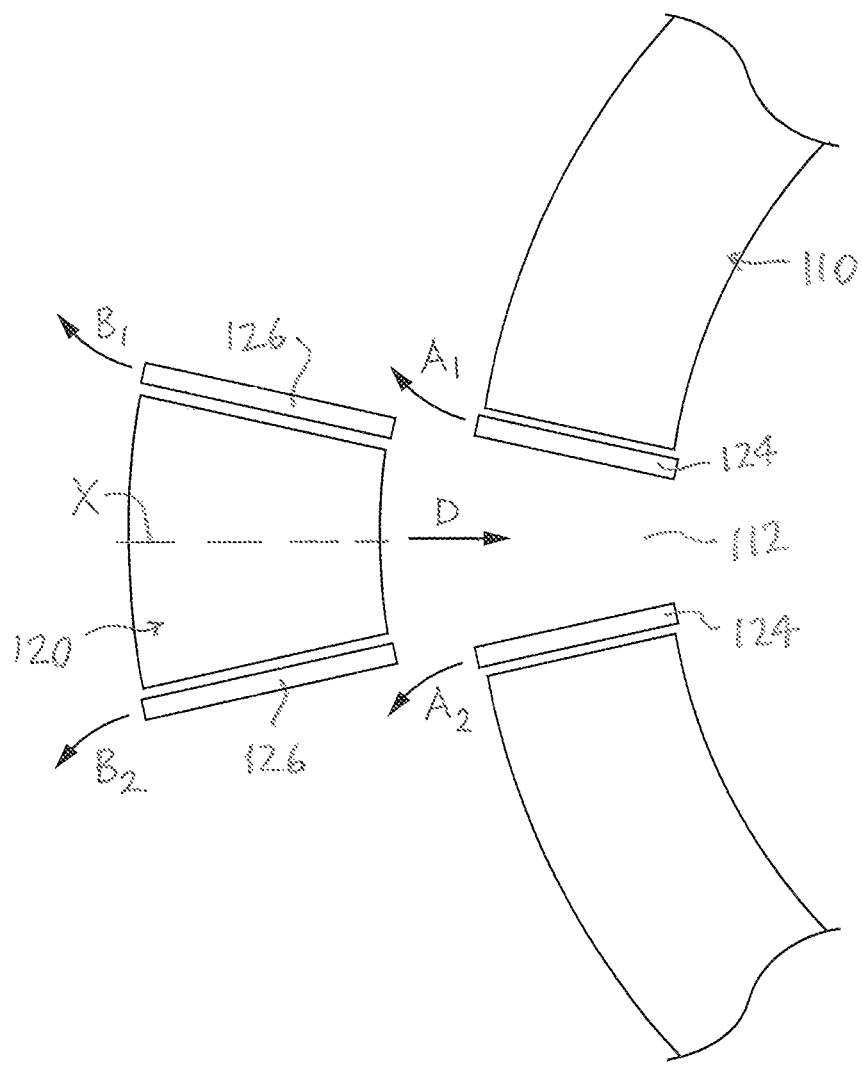
FIG. 3A is a cross-section of another embodiment of an insert of the invention prior to translocation of the insert into an opening in a metal workpiece.
Figure 3B:
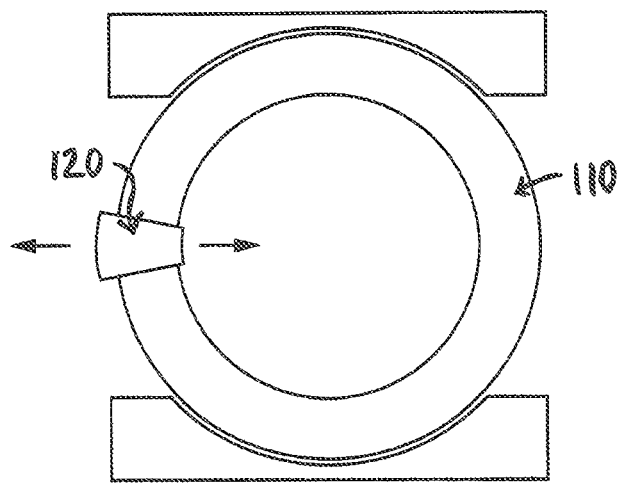
FIG. 3B is a cross-section of the metal workpiece of FIG. 3A with the insert positioned in the opening, drawn at a smaller scale.
Figure 3C:
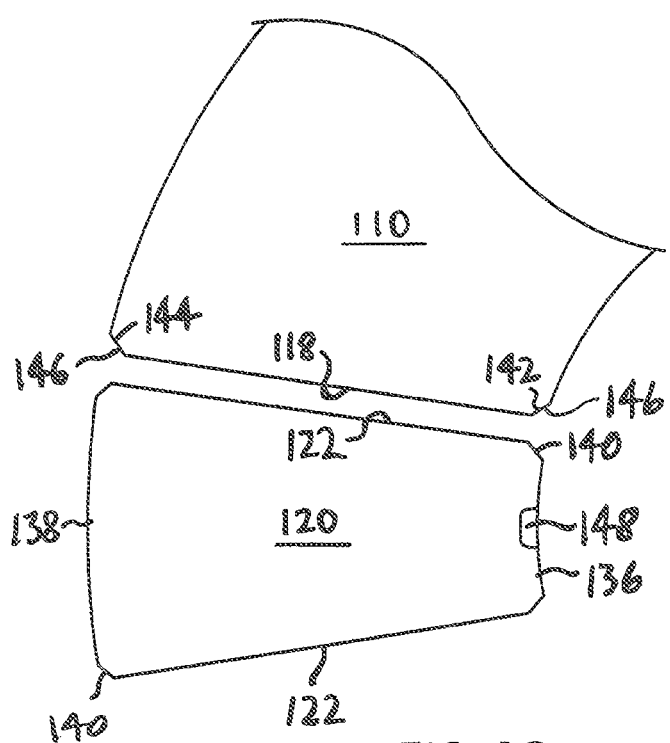
FIG. 3C is a cross-section of a metal workpiece and of another embodiment of the insert of the invention positioned in an opening in the workpiece, drawn at a larger scale.
Figure 3D:
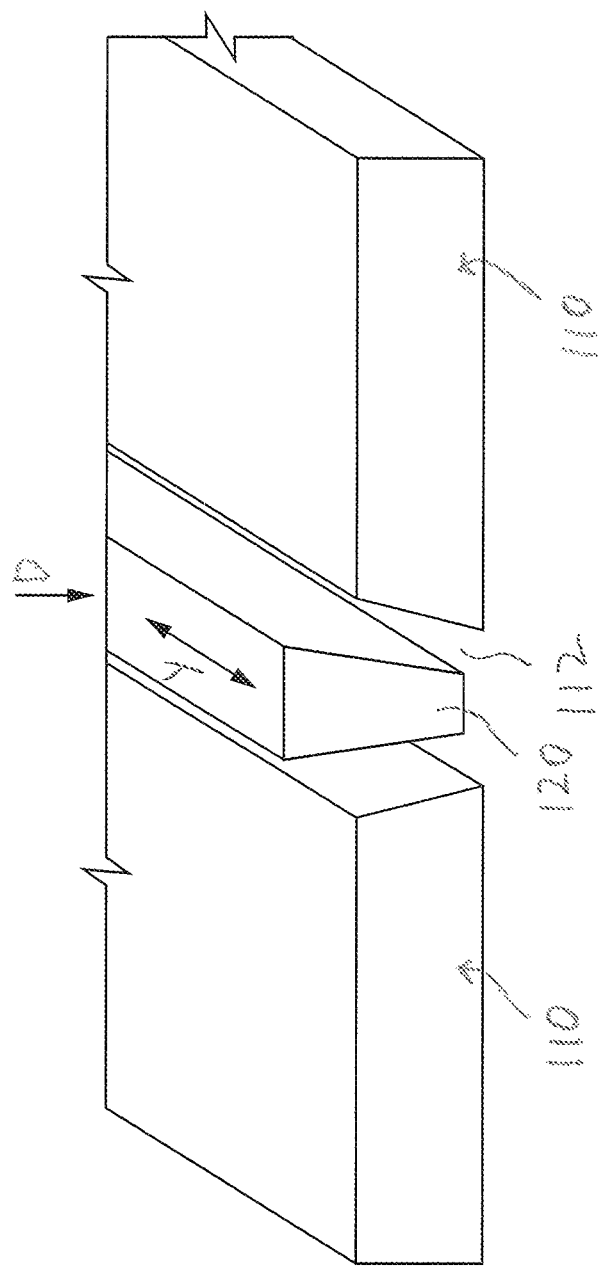
FIG. 3D is a partial isometric view of an embodiment of an insert located in an opening in a metal workpiece, drawn at a smaller scale.
Figure 3F:
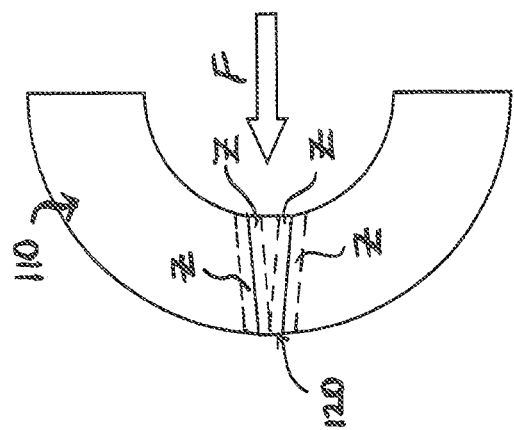
FIG. 3F is a partial cross-section of a workpiece with an embodiment of the insert of the invention positioned in an opening therein, in which the insert is translocated outwardly.
Figure 3E:
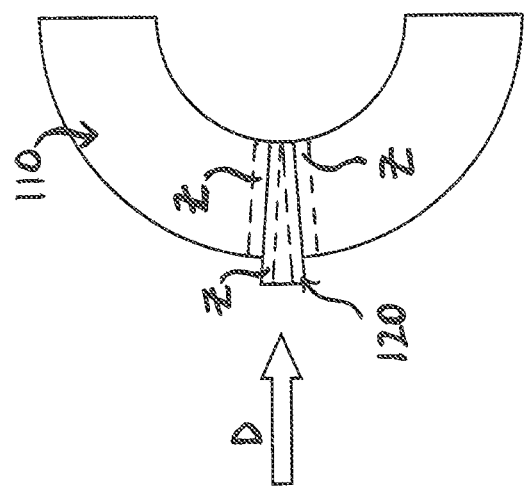
FIG. 3E is a partial cross-section of a workpiece with an embodiment of the insert positioned in an opening therein, in which the insert is translocated inwardly, drawn at a smaller scale.
Figure 3G:
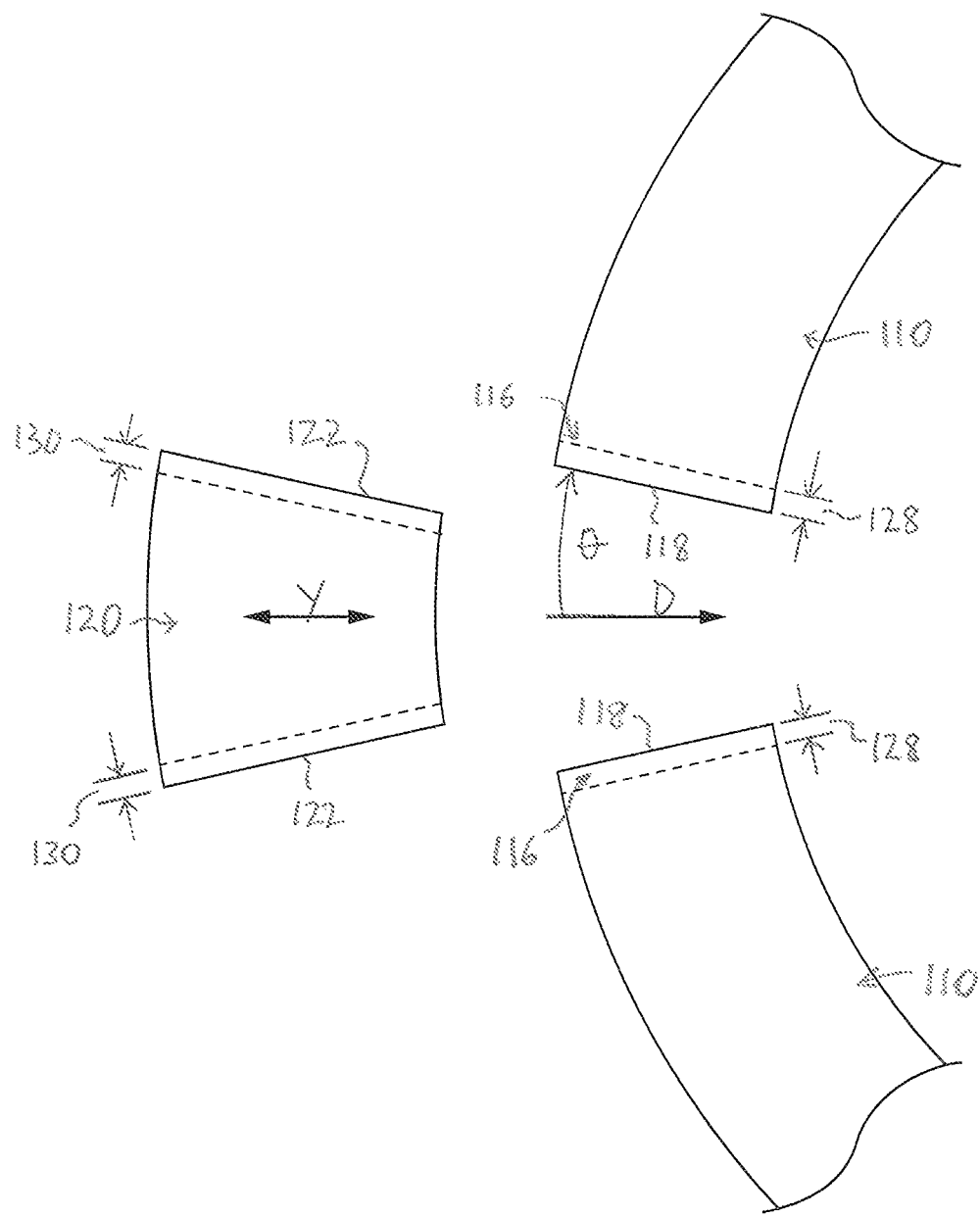
FIG. 3G is a partial cross-section of the workpiece and the insert of FIG. 3A, drawn at a larger scale.
Figure 3H:
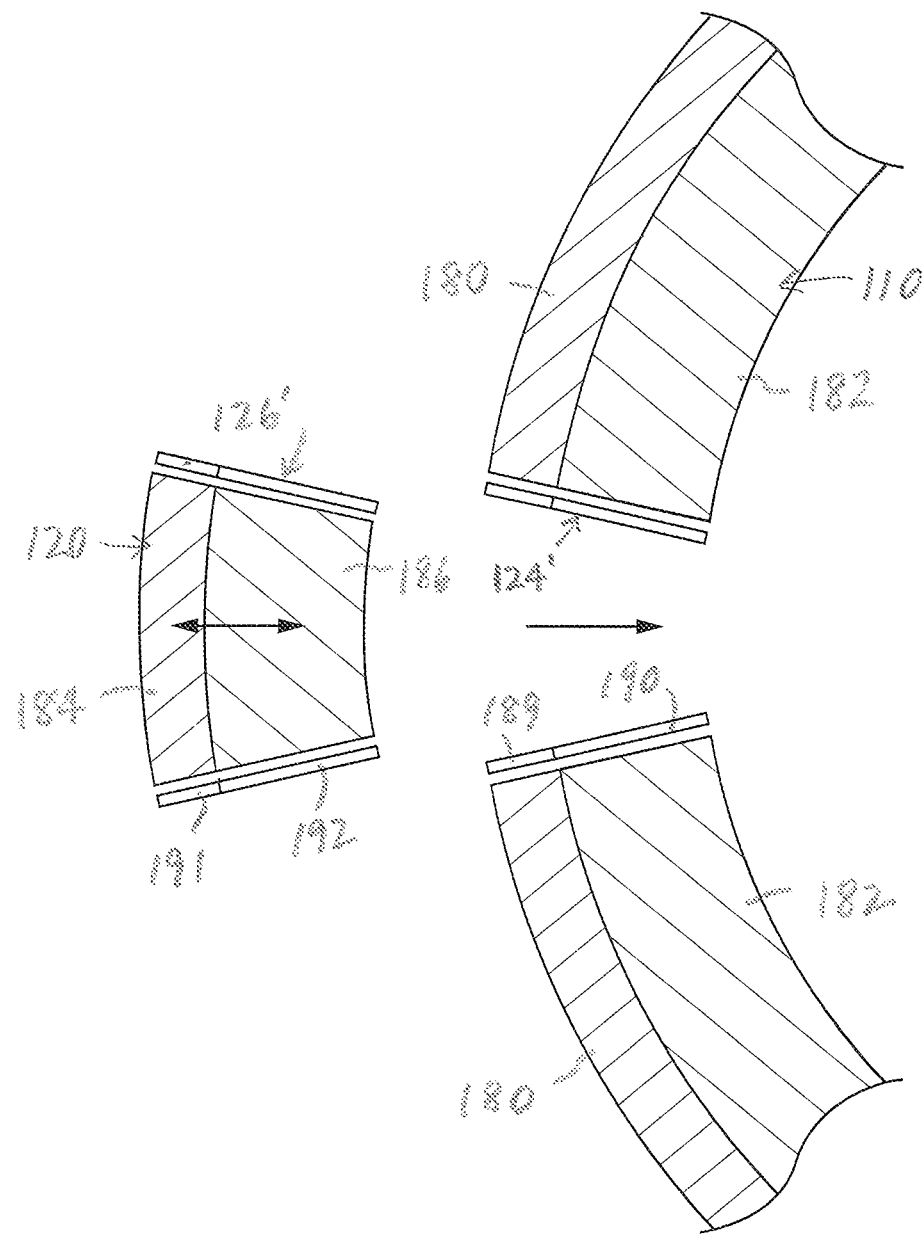
FIG. 3H is a cross-section of another workpiece with an opening therein and an alternative embodiment of an insert of the invention.

In the example illustrated in FIG. 3G, the opening 112 is at least partially defined by two opening wall surfaces 118. The opening wall surfaces 118 may be heated to the hot working temperature by any suitable means. For instance, in FIG. 2A, two opening surface heating elements 124 are shown as being located proximal to the two opening wall surfaces 118 respectively. In addition, two insert heating elements 126 are also shown in FIG. 2A, for heating the insert engagement surfaces 122 respectively to the hot working temperature.

Once the opening wall surface heating elements 124 have heated the opening wall surfaces 118 to the hot working temperature, they are removed, as indicated by arrows "$A_1$", "$A_2$" (FIGS. 2A, 3A). Also, once the insert engagement surfaces 122 have been heated to the hot working temperature, the insert heating elements 126 are removed, as indicated by arrows "$B_1$", "$B_2$" (FIGS. 2A, 3A).

The insert 120, while subjected to the engagement motion (as indicated by arrows "Y" in FIG. 3D), is moved (i.e., translocated) into the opening 118, as indicated by arrow "D" in FIGS. 3D and 3GA. As noted above, the hot working temperature is the temperature at which the insert engagement surface 122 and the opening wall surface 118 are subject to plastic deformation thereof. At the same time as the insert 120 is subjected to the engagement motion, the insert 120 is translocated to engage the workpiece 110. Upon engagement, the insert engagement surface 122 engages the opening wall surface 118. When the insert 120 engages the workpiece 110, the insert 120 is still subjected to the engagement motion, in order to plastically deform the insert engagement surface 122 and the opening wall surface 118. In a short time period immediately following the initial engagement of the insert engagement surface 122 with the opening wall surface 118, the insert 120 continues to move (i.e., is subjected to the engagement motion) relative to the workpiece 110. It will be understood that the engagement is effected with considerable force, in order to achieve metallic bonding.

The engagement of the insert engagement surface 122 with the opening wall surface 118, both of which are at the hot working temperature, results in a zone of material at the insert engagement and opening wall surfaces 122, 118 in which the insert 120 and the workpiece 110 are metallically bonded with each other. Such bonding is the result of the engagement force applied, and simultaneous engagement motion of the insert relative to the workpiece while the engaged surfaces 118, 122 are at the hot working temperature.

The method results in a workpiece and insert that are fused together to form a product in which heat-affected zones are absent. The process of the invention appears to result in a metallically bonded zone "Z" (FIGS. 3E, 3F) at which the insert and the workpiece are fused together, and in which bonded zone the metal has a uniform crystalline microstructure. As disclosed, e.g., in U.S. Pat. No. 6,637,642, the metal is heated to the temperature (the hot working temperature) at which the metal is plastically deformable. It is also believed to be important, in order to achieve a uniform crystalline microstructure in the bonded zone, that the metal not be melted during the heating and engagement steps of the process.

It will be understood that the metal of the workpiece and the metal of the insert may be any suitable materials that may be fused together by the method of the invention, e.g., alloys or metal elements, as the case may be. For instance, the metals that are fused together may include steel, aluminum, titanium, zirconium, Inconel™ and Hastelloy™. Due to the heat and shear/forging pressure that is applied, the material in the bonded zone has a uniform crystalline micro structure, which is relatively strong. For instance, it has been determined that, where the insert and the workpiece are made of steel, the steel in the bonded zone is bainitic.

The insert heating elements 126 and the opening surface heating elements 124 may be any suitable heating elements that can provide sufficient heat. Those skilled in the art would be aware of suitable heating elements. The heating elements 124, 126 preferably are configured for generally uniform heating of the opening wall surface(s) 118 and the insert engagement surface(s) 122 respectively. As can be seen, for example, in FIG. 2A, the heating elements 124, 126 preferably are removable, so that, once the surfaces 118, 122 have reached the hot working temperature, the heated insert engagement surface(s) 122 may engage the heated opening wall surface(s) 118. Preferably, the removal of the heating elements, and the subsequent engagement of the insert and the workpiece, all take place within a relatively short period of time, to minimize the extent of heat loss from the surfaces 118, 122 prior to their engagement with each other.

It is preferred that the opening wall surface 118 is uniformly heated (or substantially uniformly heated) to the hot working temperature. To achieve this uniformity, it is also preferred that the opening wall 116 is uniformly heated to the hot working temperature to a first distance 128 from the opening wall surface 118 in the opening wall 116 (FIG. 3G). Those skilled in the art would be able to determine a suitable first distance.

Preferably, the insert engagement surface 122 is also uniformly heated (or substantially uniformly heated) to the hot working temperature. To achieve this uniformity, it is also preferred that the insert 120 is uniformly heated to the hot working temperature to a second distance 130 from the insert engagement surface 122 in the insert 120 (FIG. 3G). Those skilled in the art would be able to determine a suitable second distance.

As described above, the engagement motion of the insert 120 is intended to continue when, and after, the insert engagement surface 122 engages the opening wall engagement surface 118, to cause plastic deformation of each of the hot insert engagement surface 122 and the hot opening wall surface 118. It is believed that, due to the engagement motion and the force exerted to engage the insert with the workpiece, the materials of the insert engagement surface 122 and the opening wall surface 118 are commingled or mixed together, to a very small extent. To achieve this, the engagement motion continues for a short time after the surfaces 118, 122 engage each other. The engagement motion may be any suitable motion. For example, any repetitive motion of the insert 120 relative to the workpiece 110 may be suitable. For instance, in one embodiment, the engagement motion preferably is an oscillating motion relative to the workpiece 110.

As an example, as can be seen in FIG. 3D, the insert's engagement motion may be longitudinal (i.e., back and forth), along an elongate opening 112, as the insert is moved into the opening 112 by the translocation motion. As noted above, the longitudinal engagement motion preferably continues for a short time period after the initial engagement of the insert with the opening wall, i.e., until the insert and the workpiece become bonded together. Another example of engagement motion is illustrated in FIG. 3G, in which the insert 120 is moved axially (i.e., back and forth, aligned with the direction of translocation) as the insert 120 is moved into the opening by the translocation motion (indicated by arrow "D"). It will be understood that, in this example also, the engagement motion preferably continues for a short time period after the initial engagement of the insert with the opening wall, i.e., until the insert and the workpiece become bonded together.

Alternatively, in another embodiment, the oscillating motion preferably is a linear motion of the insert, in which the insert is moved linearly relative to the workpiece, e.g., in any suitable direction. The oscillating motion may alternatively describe any suitable pattern, e.g., an arc or a partial ellipse.

In another alternative embodiment, the engagement motion preferably is a rotation of the insert 120 relative to the workpiece 110, e.g., about an axis "X" of the insert 120 (FIG. 3A). Alternatively, the engagement motion may be a vibrating motion relative to the workpiece.

As can be seen, e.g., in FIG. 3D, in one embodiment, the insert 120 preferably is subjected to an engagement motion in which the insert 120 is moved longitudinally along the opening 112, as indicated by arrow "G" in FIG. 3D. The arrow "G" is double-ended to indicate an oscillating longitudinal motion. In this example, the direction of the translocation motion is orthogonal (or substantially orthogonal) to the back-and-forth directions of the engagement motion.

In one embodiment, the opening wall surface 118 preferably is planar, and it is preferred that the insert engagement surface 122 also is planar (FIG. 3G). It will be understood that the opening wall engagement surface 118 and the insert engagement wall surface 122 preferably are formed to engage each other when the insert 120 is at least partially inserted into the opening 112. Preferably, the insert engagement surface 122 and the opening wall surface 118 are formed to cooperate with each other to locate the insert 120 at least partially in the opening 112 so that the respective areas of the surfaces are substantially engageable with each other.

As illustrated in FIGS. 2A, 3A, 3E, 3F, and 3G, it is preferred that the translocation motion is in a predetermined linear direction into the opening 112. As examples, the direction of the translocation motion is indicated by arrow "D" in FIGS. 2A, 3A, 3E, 3F, and 3G. Preferably, the opening wall surface 118 is located at a predetermined angle θ relative to the predetermined linear direction of the translocation motion (FIG. 3G). The predetermined angle may be any suitable angle. For instance, in FIG. 3G, the angle θ defined by the opening wall surfaces 118 relative to the insert's direction of translocation motion is approximately 15°.

Figure 2B:
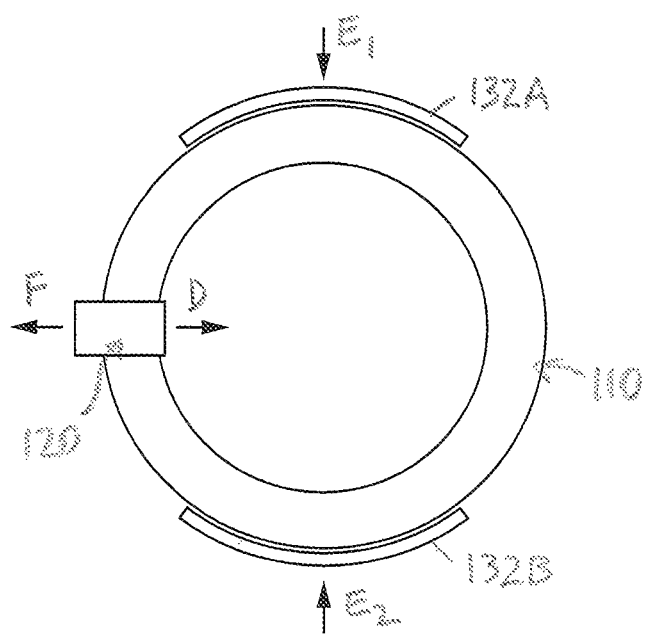
FIG. 2B is a cross-section of the metal workpiece of FIG. 2A with the insert positioned in the opening, drawn at a smaller scale.
Figure 2C:
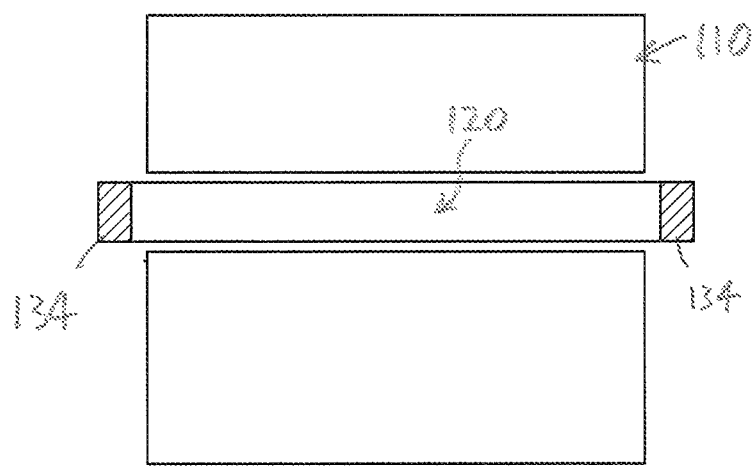
FIG. 2C is a cross-section of the metal workpiece of FIGS. 2A and 2B with the insert positioned in the opening, drawn at a larger scale.

Those skilled in the art would appreciate that, in FIGS. 2A-2C, the opening wall surfaces 118 preferably are substantially parallel with the insert engagement surfaces 122 that are to be engaged therewith. It will be understood that in the embodiment illustrated in FIGS. 2A-2D, the insert 120 preferably is slightly wider than the opening 112. That is, the width "$W_1$" of the insert 120 identified in FIG. 2A preferably is slightly wider than the width "$W_2$" of the opening 112, when the surfaces are heated to the hot working temperature.

As can be seen, e.g., in FIG. 2B, in one embodiment, one or more clamps 132A, 132B preferably exert inwardly-directed pressure (schematically represented by arrows "$E_1$", "$E_2$") onto the workpiece 110, to maintain the shape of the workpiece, and to hold the workpiece stationary.

As can also be seen, e.g., in FIGS. 2A, 2B, 3A, 3B, 3F, and 3G, the translocation motion preferably is in the predetermined linear direction, into the opening 112. As illustrated in FIGS. 2B, 3B, 3F, and 3G, the translocation movement of the insert 120 may be, for example, inwardly (as indicated by arrow "D"), or outwardly (as indicated by arrow "F").

Once the insert 120 is positioned at least partially in the opening 112 and the insert has bonded with the workpiece, one or more portions 134 thereof may extend beyond the opening wall surface(s) 118 of the workpiece that the insert 120 has bonded with (FIG. 2C). In this situation, the portions 134 may be cut off or otherwise removed, using any suitable means.

It will be understood that, during the engagement of the insert engagement surface 122 and the opening wall surface 118, a small portion of the material that is plastically deformed may be extruded from the insert and/or the workpiece, along an exposed part of the insert and/or the workpiece at the surfaces 118, 122. Depending on the specifications that the bonded or fused insert and the workpiece are required to meet, the extruded material, once cooled, may be required to be removed. In practice, however, such removal may be difficult, and time-consuming.

Those skilled in the art would appreciate that the insert 120 may have any suitable configuration. In one embodiment, illustrated in FIG. 3C, the insert 120 preferably extends between an inner end 136 and an outer end 138 thereof, and the insert 120 preferably also includes one or more chamfered insert surfaces 140 located proximal to the insert engagement surfaces 122, at one or more of the inner and outer ends 136, 138. The chamfered insert surfaces 140 preferably are formed in order to minimize the amount of extruded material that may extend beyond the insert 120 and/or the workpiece 110 at inner and/or outer sides of the insert, once the insert and the workpiece are bonded together.

As can also be seen in FIG. 3C, each of the opening wall surfaces 118 preferably extends between an internal end 142 and an external end 144. It is preferred that the workpiece 110 includes one or more chamfered workpiece surfaces 146 located proximal to the opening wall surface(s) 118 at one or more of the internal and external ends 142, 144. The chamfered workpiece surfaces 146 preferably are formed in order to minimize the amount of extruded material that may extend beyond the insert 120 and/or the workpiece 110 at inner and/or outer sides of the insert.

The chamfered surfaces 140, 146 define spaces into which any plastically deformed material that is squeezed out as the insert is engaged with the workpiece may enter, so that such material is not extruded into the interior of the tube workpiece, or alternatively, not extruded onto the exterior surface of the tube workpiece.

In one embodiment, it is preferred that the insert 120 includes one or more notches 148 formed at the inner end 136, to minimize the amount of extruded material that may protrude into the interior of the tube workpiece.

Figure 2D:
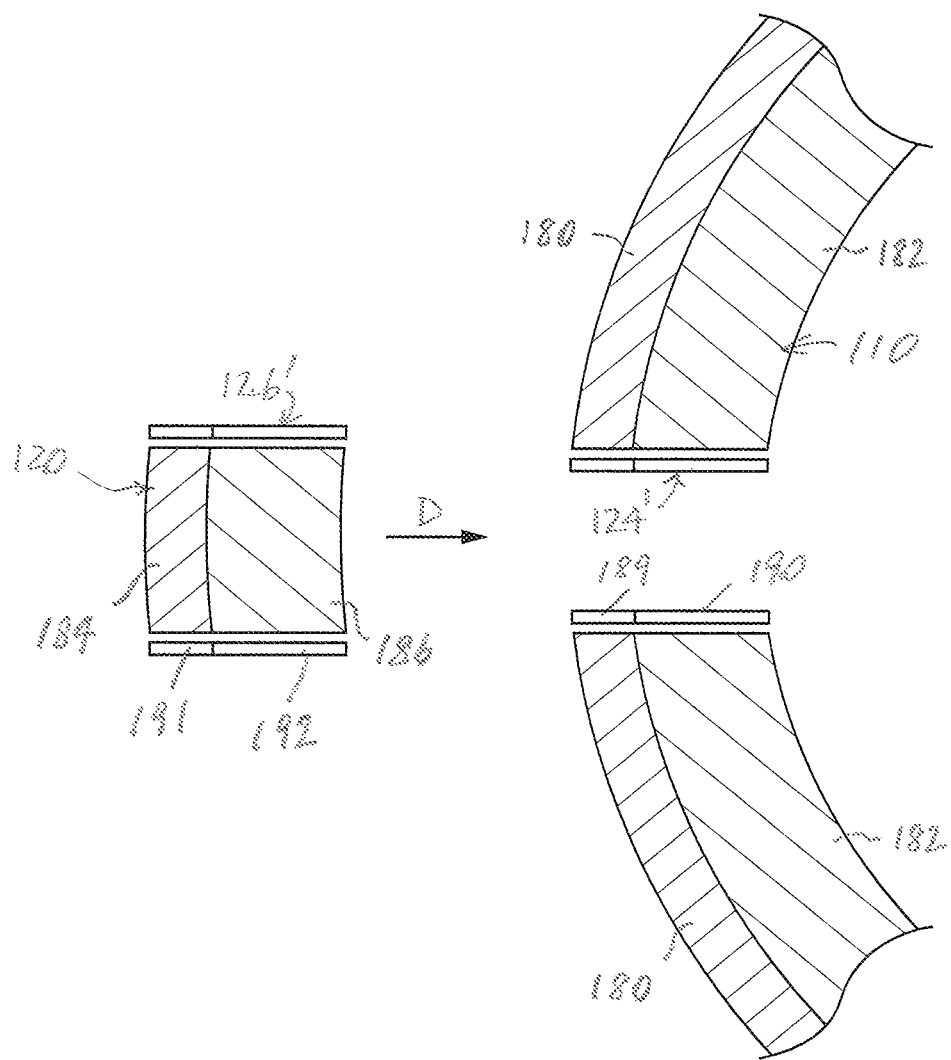
FIG. 2D is a cross-section of another workpiece with an opening therein and an alternative embodiment of an insert of the invention, drawn at a larger scale.
Figure 2E:
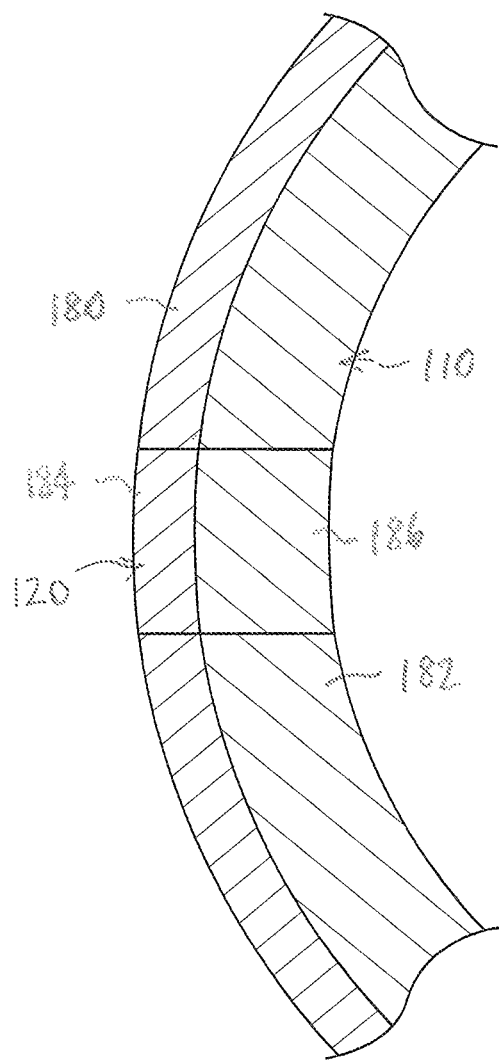
FIG. 2E is a cross-section of the workpiece of FIG. 2D, with the insert of FIG. 2D located in the opening.
Figure 3I:
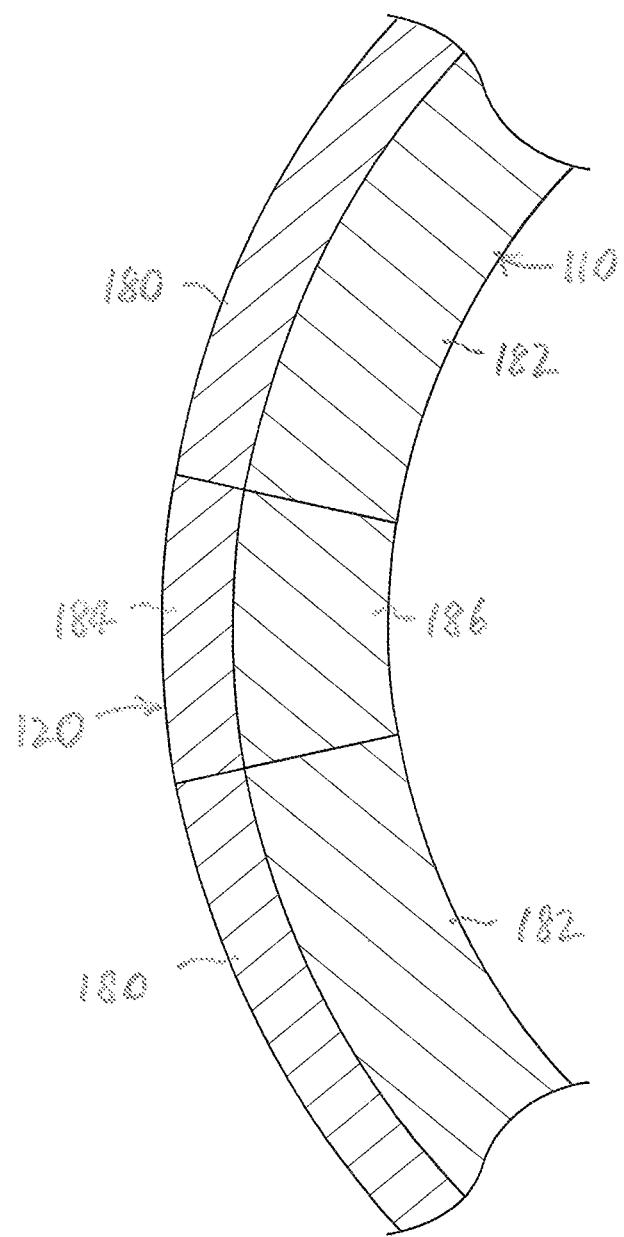
FIG. 3I is a cross-section of the workpiece of FIG. 3H, with the insert of FIG. 3H located in the opening.

The workpiece 110 may include two or more layers of respective metals. For example, as illustrated in FIGS. 2D and 3I, the workpiece 110 may include a first layer 180 of a first metal, and a second layer 182 of a second metal. It will be understood that, to form the workpiece 110, the layers 180, 182 may be fused together using any suitable method.

Where the workpiece 110 includes two or more layers of respective metals, it is preferred that the insert 120 also includes layers 184, 186 to fuse or bond with the layers 180, 182 respectively. When the insert 120 is at least partially located in the opening, the layers 184, 186 are metallically bondable with the layers 180, 182 respectively (FIGS. 2E, 3J). For instance, as illustrated in FIGS. 2D and 2E, and in FIGS. 3I and 3J, in one embodiment, the insert 120 preferably includes the layers 184, 186 of steel and copper respectively. It is also preferred that the layers 184, 186 are formed so that, when the insert 120 is at least partially located in the opening 112, the layers 184, 186 are substantially aligned with the corresponding layers 180, 182 of steel and copper respectively in the workpiece 110.

Heating elements 124', 126' preferably are used to heat the opening wall surface 118 and the insert engagement surface 122 respectively. The heating elements 124' preferably include first and second parts 189, 190 for heating the first and second layers 180, 182 respectively. Also, the heating elements 126' preferably include first and second parts 191, 192 for heating the layers 184, 186 of the insert 120 respectively.

Figure 4A:
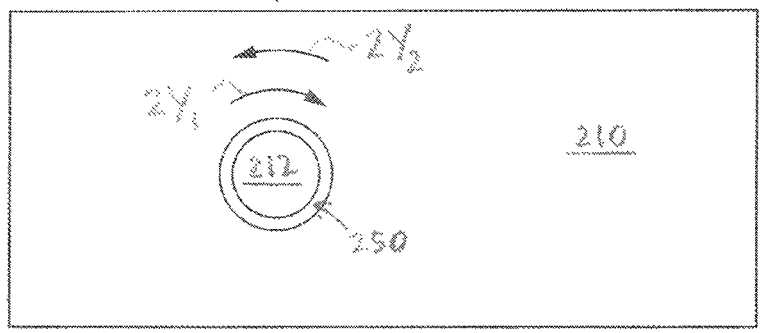
FIG. 4A is a top view of a workpiece with an embodiment of a tube insert of the invention positioned thereon, drawn at a smaller scale.
Figure 4B:
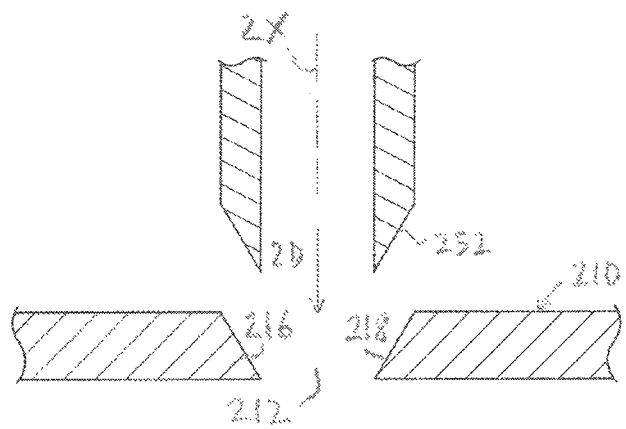
FIG. 4B is a cross-section of the workpiece and the tube insert of FIG. 4A, prior to translocation of the tube insert toward the workpiece, drawn at a larger scale.
Figure 4C:
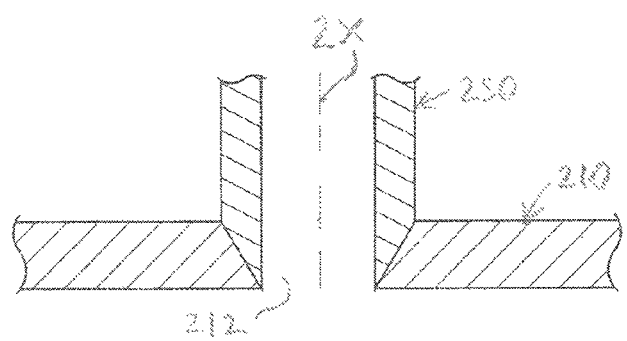
FIG. 4C is a cross-section of the workpiece and the tube insert of FIGS. 4A and 4B in which the tube insert is bonded with the workpiece.

In an alternative embodiment illustrated in FIGS. 4A-4C, the method of the invention is for at least partially attaching a tube 250 to a workpiece 210 made of a metal, to at least partially align the tube 250 with one or more openings 212 in the workpiece 210. The tube 250 is also made of a metal that is bondable with the metal of the workpiece 210 (i.e., preferably the same metal). The opening 212 is at least partially defined by one or more opening walls 216 having one or more opening wall surfaces 218 (FIG. 4B). The method preferably includes forming one or more tube engagement surfaces 252 on the tube 250 that are configured for engagement with the opening wall surface(s) 218. Preferably, the opening wall surface 218 is heated in a first non-oxidizing atmosphere to a hot working temperature, at which the opening wall surface 218 is plastically deformable. It is also preferred that the tube engagement surface 252 is heated in a second non-oxidizing atmosphere to the hot working temperature, at which the tube engagement surface 252 is plastically deformable. Next, the tube 250 preferably is subjected to an engagement motion, to move the tube engagement surface 252 relative to the opening wall surface 218.

It will be understood that heating elements and clamps are omitted from FIGS. 4A-5B to simplify the illustration.

While the tube 250 is subjected to the engagement motion, and while the tube engagement surface 252 and the opening wall surface 218 are at the hot working temperature, the tube 250 preferably is also subjected to a translocation motion to move the tube 250 at least partially into the opening 212, for engaging the tube engagement surface 252 with the opening wall surface 218 while the tube is subjected to the engagement motion. As described above, this causes plastic deformation of the opening wall surface 218, and plastic deformation of the tube engagement surface 252 also as they engage each other, for at least partially creating a metallic bond between the tube 250 and the workpiece 210. Finally, the tube 250 and the workpiece 210 are allowed to cool, to solidify the tube 250 and the workpiece 210 together.

As can be seen in FIGS. 4A-4C, the workpiece 210 may be, for example, a flat sheet of metal, e.g., steel. In FIG. 4B, the tube 250 and the workpiece 210 are shown shortly before engagement of the tube 250 and the workpiece 210. It will be understood that the heating elements and other elements needed to implement the method of the invention (e.g., clamps) are omitted from FIG. 4B for clarity of illustration.

The engagement motion may be, for example, a repeated or oscillating rotational motion of the tube 250 about its axis "2X", as indicated by arrows "$2Y_1$" and "$2Y_2$" in FIG. 4A. The translocation motion is in the direction indicated by arrow "2D" in FIG. 4B. The translocation motion preferably is coaxial with the axis "2X".

In FIG. 4B, it can be seen that, in one embodiment, the tube engagement surface 252 preferably is planar, and positioned at a selected angle relative to the direction of the translocation motion. Also, the opening wall surface 218 preferably is planar, and positioned at the selected angle relative to the direction of the translocation motion.

As described above, while the tube 250 is subjected to the engagement motion, it is simultaneously moved in the direction indicated by arrow "2D", to engage the tube engagement surface 252 with the opening wall surface 218. Preferably, after the tube engagement surface 252 initially engages the opening wall surface 218, the tube 250 is still moving in accordance with the engagement motion. At that point in the process, the tube 250 continues to be pressed against the workpiece 210 in the direction indicated by arrow "2D", while the insert 250 is subject to the engagement motion. This results in the plastic deformation of the tube engagement surface 252 and the opening wall surface 218, resulting in the tube 250 fusing with the workpiece 210, as described above.

The tube 250 and the workpiece 210 rapidly cool after initial engagement, and the engagement motion ceases shortly after the initial engagement because the tube 250 and the workpiece 210 rapidly bond together, preventing further engagement motion.

Figure 5A:
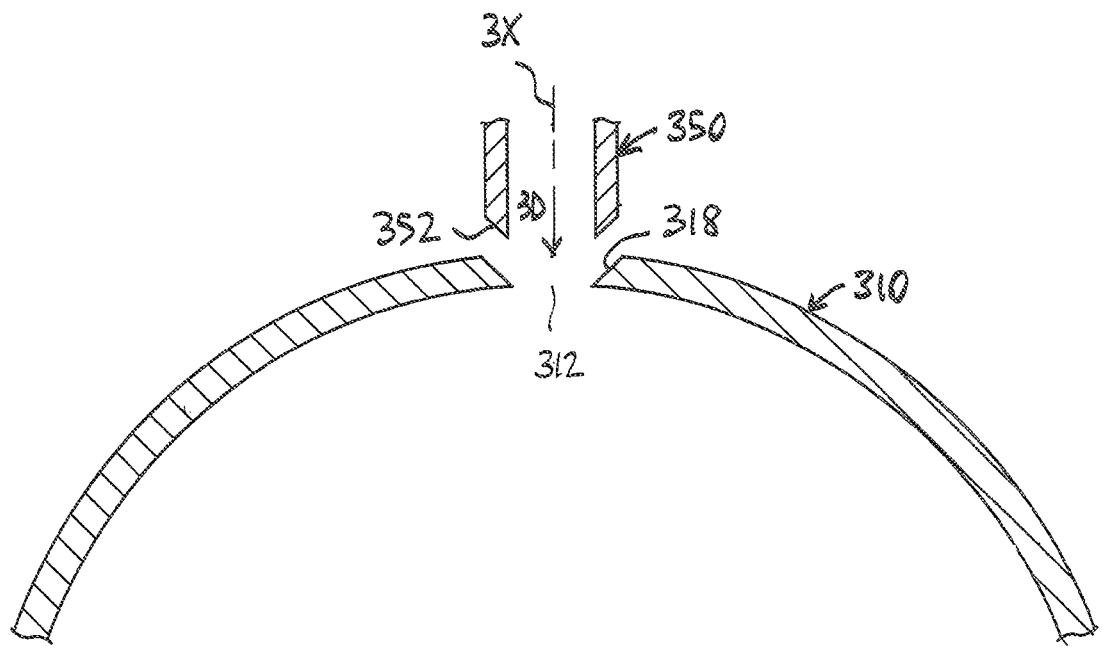
FIG. 5A is a cross-section of another embodiment of the insert of the invention and a metal workpiece prior to translocation of the tube insert toward the workpiece.
Figure 5B:
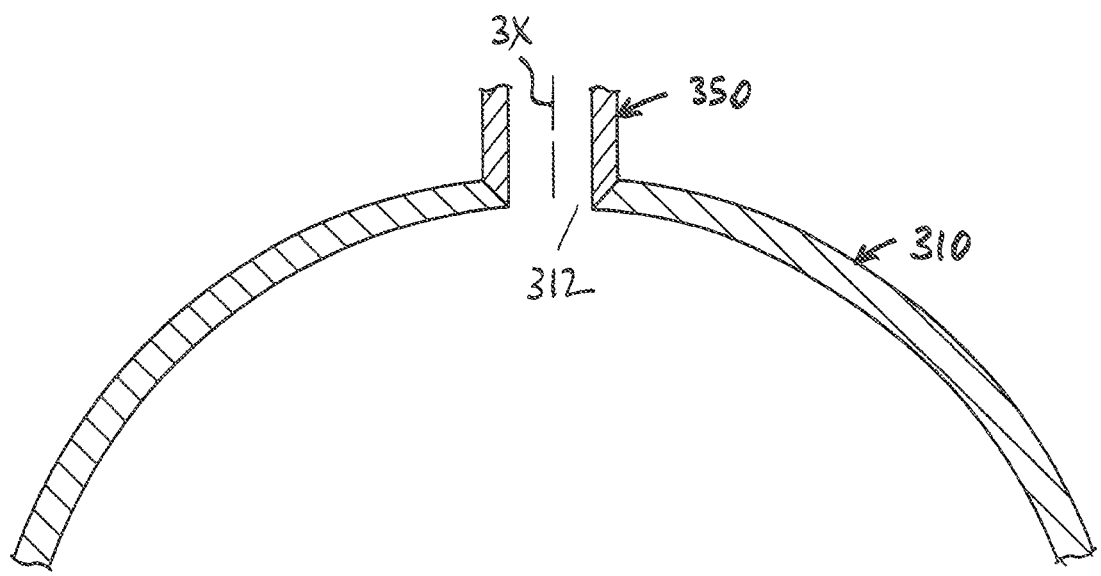
FIG. 5B is a cross-section of the metal workpiece of FIG. 5A with the tube insert bonded therewith.

In FIGS. 5A and 5B, a tube 350 is shown being bonded with a workpiece 310. The tube 350 defines an axis "3X" thereof. The tube 350 is aligned with an opening 312. In FIG. 5A, the tube engagement surface 352 and the opening wall surface 318 can be seen, prior to their engagement. It will be understood that the heating elements and other elements (e.g., clamps) needed to implement the method of the invention are omitted from FIG. 5A for clarity of illustration. It will also be understood that the tube 350 is subjected to the engagement motion while the tube engagement surface 352 and the opening wall surface 318 are both heated, in non-oxidizing atmospheres, to the hot working temperature. The engagement motion may be, for example, an oscillating rotational motion of the tube 350 about its axis "3X". The tube 350 is then moved in the translocation motion direction (indicated by arrow "3D"), while still subjected to the engagement motion.

The tube engagement surface 352 and the opening wall surface 318 are subjected to plastic deformation upon their engagement and shortly thereafter, to form a metallic bond between the tube 350 and the workpiece 310.

The workpiece 310 may be, for example, a body of a manifold, and the tube 350 may be one of several tubes (not shown) secured to the body, to form the manifold.

Figure 6A:
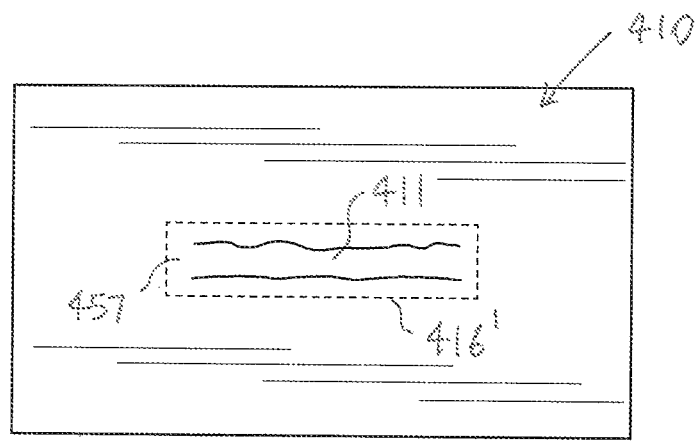
FIG. 6A is a plan view of a workpiece with a defective region therein, drawn at a smaller scale.
Figure 6B:
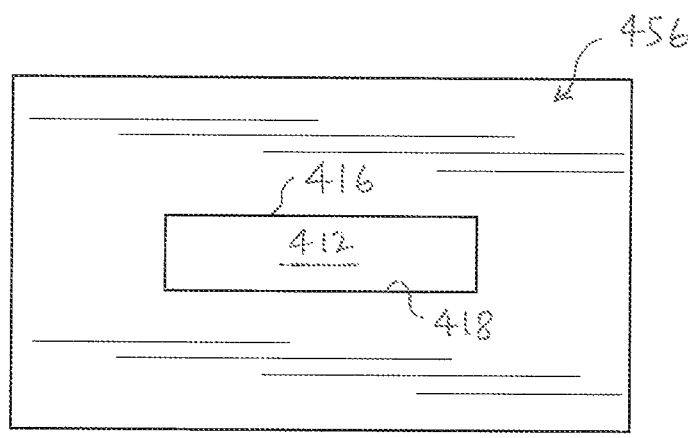
FIG. 6B is a plan view of the workpiece of FIG. 6A from which the defective region has been removed therefrom, to produce a remainder segment with an initial opening therein.

In another alternative embodiment illustrated in FIGS. 6A-6J, the method of the invention is for repairing a workpiece 410 that includes a preselected region 411 thereof (FIG. 6A). The preselected region 411 may be any region in which an insert is to be inserted, for example, a defective or worn region of the workpiece 410. Preferably, the method includes forming one or more opening walls 416 in the workpiece 410 at least partially around the preselected region 411 to produce a remainder segment 456 of the workpiece 410. In FIG. 6A, a dashed line 416' indicates the location of the opening wall 416 in relation to the preselected region 411.

It will be understood that, to form the opening walls 416, material may be removed from peripheral regions 457 (FIG. 6A) around the preselected region 411 of defective or worn (e.g., corroded) material of the workpiece 410. The opening wall 416 preferably includes one or more opening wall surfaces 418 (FIG. 6C) defining at least one initial opening 412. As will be described, the opening walls 416 preferably are formed to define the shape of the initial opening 412 so that an insert 458 is receivable in the opening 412. Preferably, the opening 412 includes or encompasses or coincides with the preselected region 411.

The preselected region 411 may be any part of the workpiece that is to be replaced. For instance, the preselected region 411 may be a part of the workpiece that has corroded or weakened over time, or that includes pitting or cracking resulting from use. The preselected region 411 may alternatively include defects formed when the workpiece was manufactured.

Figure 6C:
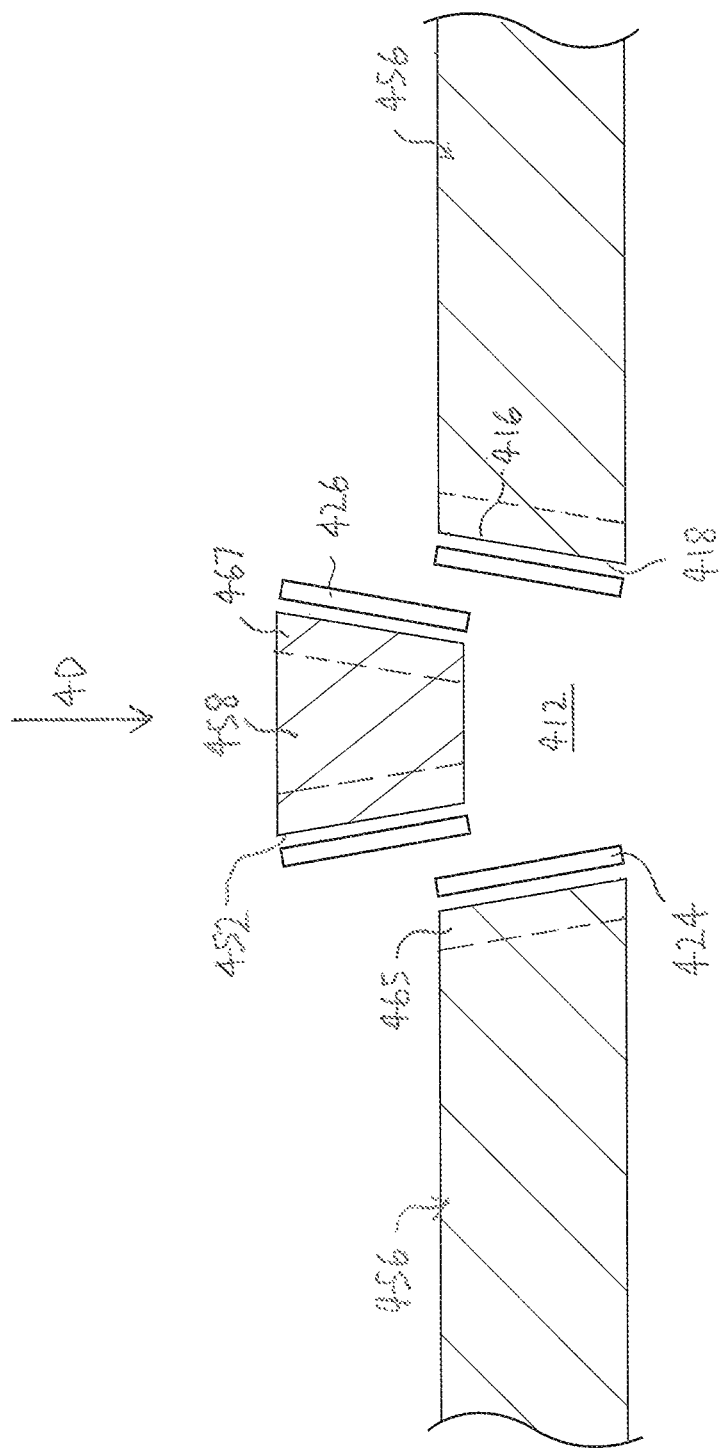
FIG. 6C is a cross-section of the workpiece of FIG. 6B with an insert positioned for insertion thereof into the initial opening.

Preferably, the insert 458 is metallically bondable with the remainder segment 456. It is preferred that the insert 458 is formed to at least partially fit into the opening 412, as shown in FIGS. 6C and 6E. The insert 458 preferably has one or more insert engagement surfaces 452 formed for engagement with the opening wall surface 418 (FIG. 6C).

It is also preferred that an inert (non-oxidizing) atmosphere is provided that covers the insert 458, one or more heating elements, and the remainder segment 456. Those skilled in the art would appreciate that the non-oxidizing atmosphere preferably is held in position by a suitable covering or container (not shown). The covering or container is omitted from the drawings for clarity of illustration.

Preferably, one or more heating elements are positioned in respective predetermined positions relative to the insert engagement surface 452 and to the opening wall surface 418. As can be seen in FIG. 6C, one or more first heating elements 424 preferably are positioned in predetermined positions relative to the opening wall surface 418, and one or more second heating elements 426 preferably are positioned in predetermined positions relative to the insert engagement surface 452.

Next, the heating elements 424, 426 are energized, to heat a remainder segment heated portion 465 and an insert heated portion 467 to a hot working temperature. The remainder segment heated portion 465 and the insert heated portion 467 are plastically deformable at the hot working temperature. It will be understood that the heating elements 424, 426 preferably are configured for induction heating of the remainder segment heated portion 465 and the insert heated portion 467.

As can be seen in FIG. 6C, the remainder segment heated portion 465 extends from the opening wall surface 418 into the remainder segment 456. Similarly, the insert heated portion 467 extends from the insert engagement surface 452 into the insert 458.

It will also be understood that the widths of the respective heated portions 465, 467 are exaggerated in FIG. 6C, for clarity of illustration. In practice, the heated portions 465, 467 are extremely thin, e.g., approximately five millimeters.

Once the remainder segment heated portion 465 and the insert heated portion 467 are at the hot working temperature, the heating elements 424, 426 preferably are removed, to enable the insert 458 to be moved to engage the remainder segment 456.

After the heating elements have been removed, and while the remainder segment heated portion 465 and the insert heated portion 467 are at the hot working temperature, the insert 458 preferably is subjected to an engagement motion, to move the insert engagement surface 452 relative to the opening wall surface 418. It will be understood that the insert's engagement motion may be any suitable motion thereof, relative to the remainder segment 456. For example, the insert 458 may be oscillated in the directions indicated by arrow "4Y" in FIG. 6D.

Preferably, while the insert 458 is subjected to the engagement motion, and while the remainder segment heated portion 465 and the insert heated portion 467 are at the hot working temperature, the insert 458 is also subjected to a translocation motion, to push the insert 458 at least partially into the initial opening 412. The direction of the translocation motion is indicated by arrow "4D" in FIG. 6C.

The insert 458 is moved into the opening 412 to engage the insert engagement surface 452 with the opening wall surface 418. While the insert is subject to the engagement motion, and while the remainder segment heated portion 465 and the insert heated portion 467 are at the hot working temperature, the insert engagement surface 452 is pressed against the opening wall surface 418, to cause plastic deformation of the remainder segment heated portion 465 and the insert heated portion 467, for creating a metallic bond between the insert 458 and the remainder segment 456. The direction in which the insert 458 is pressed against the remainder segment 456 is indicated by arrow "4G" in FIG. 6E.

Finally, the first insert 458 and the remaining portion 456 of the workpiece 410 preferably are permitted to cool, to bond or fuse the insert 458 and the remainder segment 456 together.

Figure 6D:
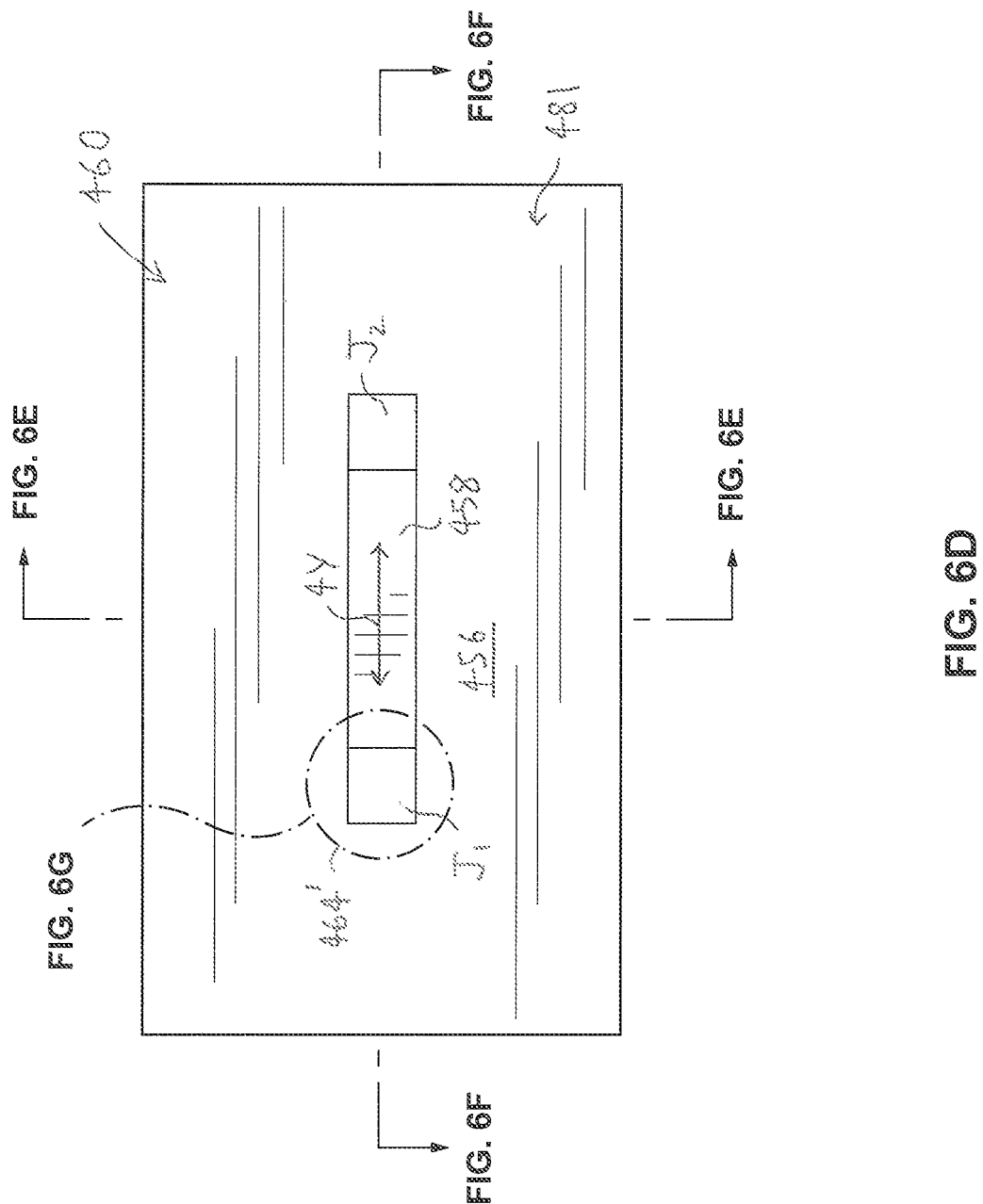
FIG. 6D is a plan view of the workpiece of FIGS. 6A and 6B with the insert located in the initial opening, to provide an incomplete workpiece, drawn at a larger scale.
Figure 6E:
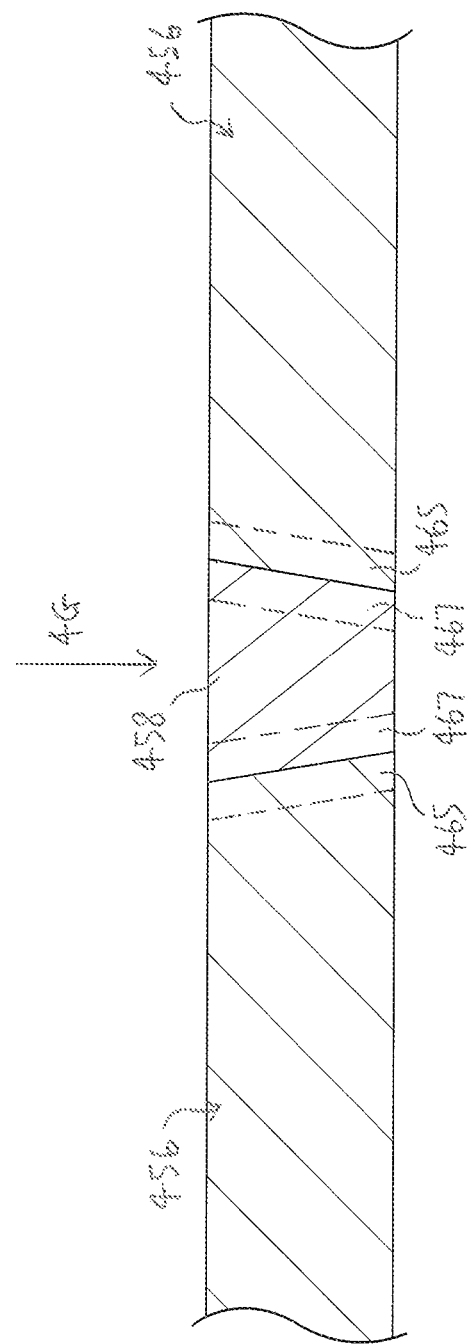
FIG. 6E is a cross-section of the incomplete workpiece of FIG. 6D, with the insert positioned in the initial opening.
Figure 6F:
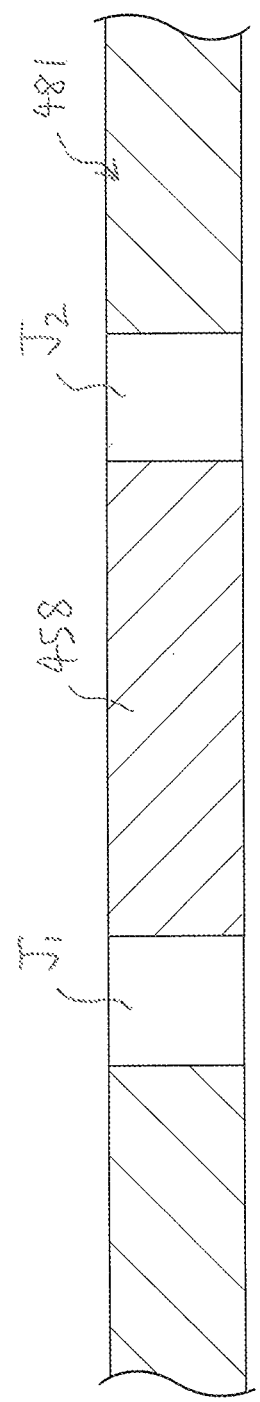
FIG. 6F is another cross-section of the incomplete workpiece of FIG. 6D.

As can be seen in FIG. 6D, once the insert 458 and the remainder segment 456 are bonded together, the initial opening 412 is not fully occupied by the first insert 458. In these circumstances, the remainder segment 456 and the insert 458 form an incomplete workpiece 460 (FIG. 6D). The incomplete workpiece 460, as illustrated in FIG. 6D, includes a body 481 and unfilled parts "$J_1$", "$J_2$", of the initial opening 412 that remain unoccupied after the first insert 458 and the remainder segment 456 of the workpiece have been fused together, i.e., metallically bonded together, as described above. When the first insert 458 and the remainder segment 456 are bonded together, they form the body 481.

In the example illustrated in FIG. 6D, there are two unfilled parts "$J_1$", "$J_2$", located at each end of the insert 458. Based on the description above, it can be seen that the engagement motion of the insert 458 in the initial opening 412 may be an oscillation in the directions indicated by arrow "4Y" in FIG. 6D. Those skilled in the art would appreciate that, when the insert 458 becomes fused or bonded to the remainder segment 456, depending on the position of the insert 458 at that point, the parts "$J_1$", "$J_2$" of the initial opening 412 may remain unfilled. It will be understood that the insert 458 may become bonded to the remainder segment 456 when it is at one end of the initial opening 412, and in these circumstances, only one unfilled part may be defined.

Those skilled in the art would appreciate that, when the first insert engagement surface 452 and the opening wall surface 418 are engaged with each other and plastically deformed, some material may be extruded from between the engaged surfaces 452, 418. For example, in FIG. 6G, the extruded material is shown located in the unfilled part "$J_1$". For convenience, the extruded material is identified in FIG. 6G by reference characters "$K_1$", "$K_2$". It will be understood that the extruded material may be extruded at any point(s) where the first insert engagement surface(s) 452 and the opening wall surface(s) 418 meet. It is believed that the extruded material will tend to be extruded into a nearby void, e.g., the parts "$J_1$", "$J_2$".

Preferably, in order to complete the repair or replacement of the preselected region 411 of the original workpiece 410, the unfilled parts "$J_1$", "$J_2$" of the initial opening 412 are to be filled, as will be described.

Figure 6G:
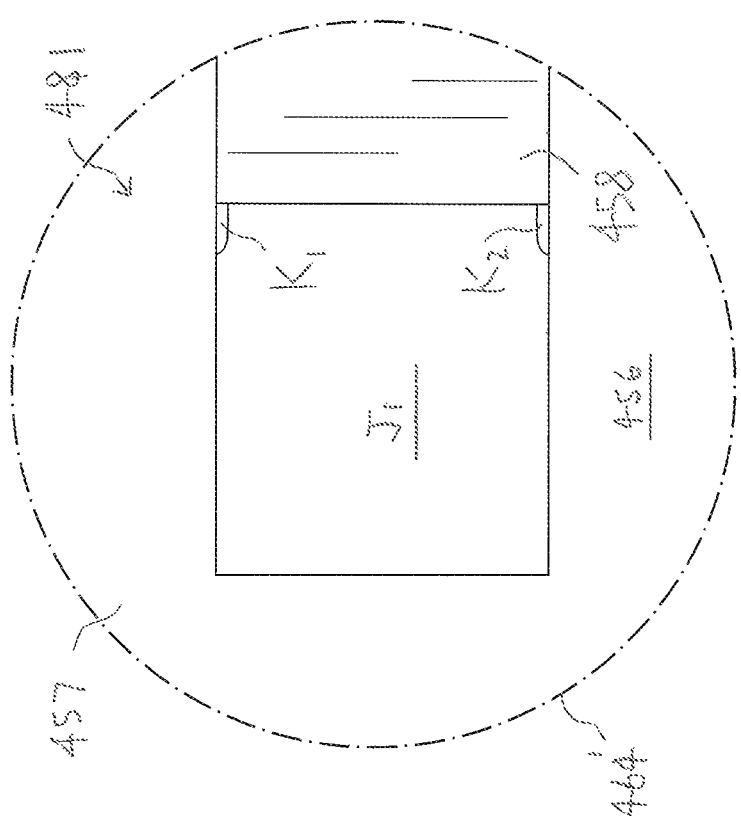
FIG. 6G is a plan view of a portion of the incomplete workpiece of FIG. 6D, drawn at a larger scale.
Figure 61:
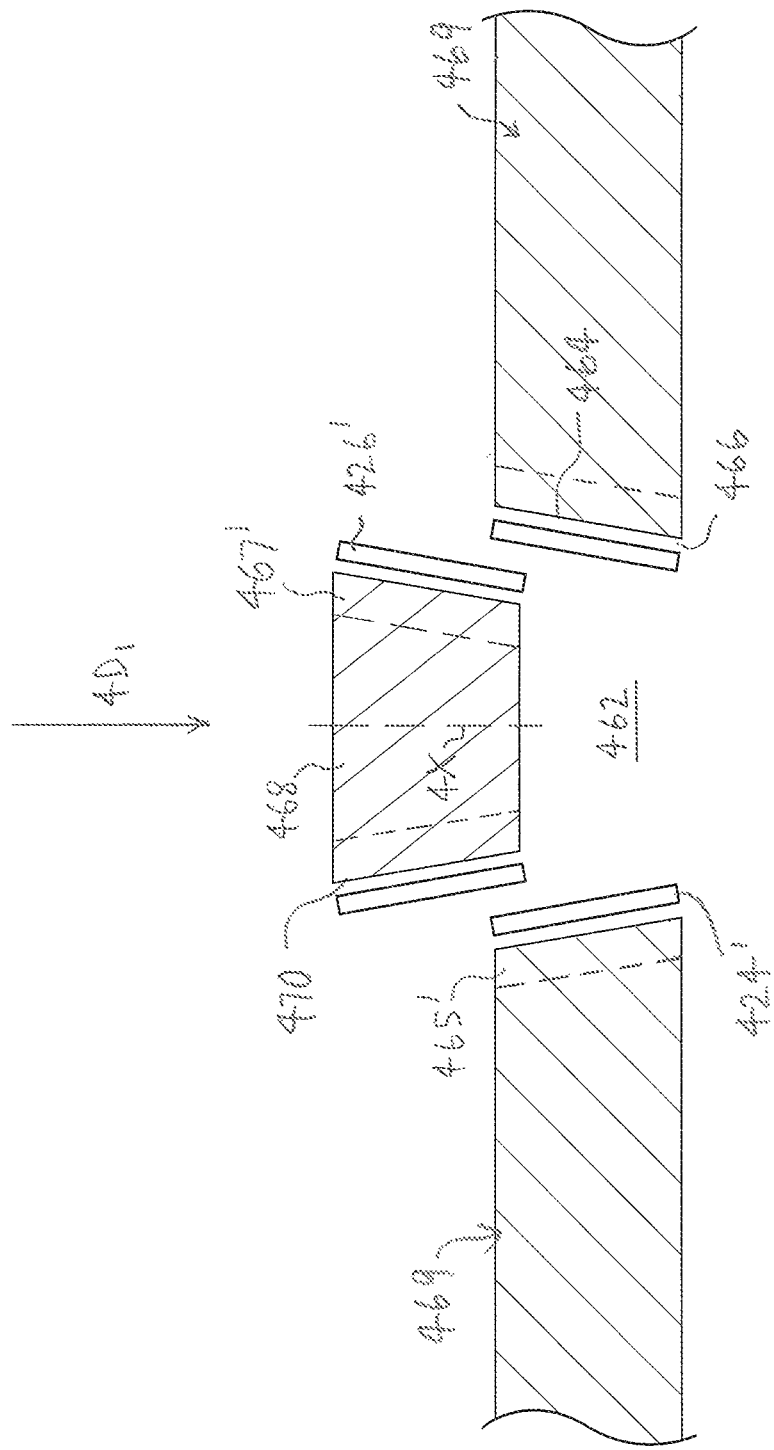

In order to achieve this, one or more border regions or peripheral regions 457 are removed from the body 481 at least partially around the one or more unfilled parts "$J_1$", "$J_2$" to form one or more corresponding supplementary opening walls 464 in the body 481, producing a residual segment 469 of the body 481 (FIGS. 6G, 6H). Each of the supplementary opening walls 464 has one or more supplementary opening wall surfaces 466 defining a supplementary opening 462 (FIGS. 6D, 6H). Each of the supplementary openings 462 encompasses, or coincides with or includes, one of the unfilled parts "J", "J". The unfilled parts are outlined in dashed lines in FIG. 6H.

In the example illustrated in FIG. 6H, there are two supplementary openings 462, i.e., each one encompassing or including one of the parts "$J_1$", "$J_2$" of the initial opening 412. Those skilled in the art would appreciate that the supplementary openings 462 may be formed using any suitable tools.

In FIGS. 6D and 6G, a dashed line 464' indicates the location of the supplementary opening wall 464 in relation to the unfilled part "$J_1$". As can be seen in FIGS. 6G and 6H, the peripheral regions 457 are located around, or partially around, the unfilled parts "$J_1$", "$J_2$" that are formed when the insert 458 is fused or bonded with the remainder segment 456. In the examples illustrated in FIGS. 6G and 6H, the peripheral regions 457 are removed from the body 481 in order to provide the supplementary openings 462 that are round, in plan view. As will be described, this shape of the supplementary opening may facilitate an engagement motion of the plug, thereby facilitating bonding or fusing plugs with the residual segment 469.

Figure 6J:
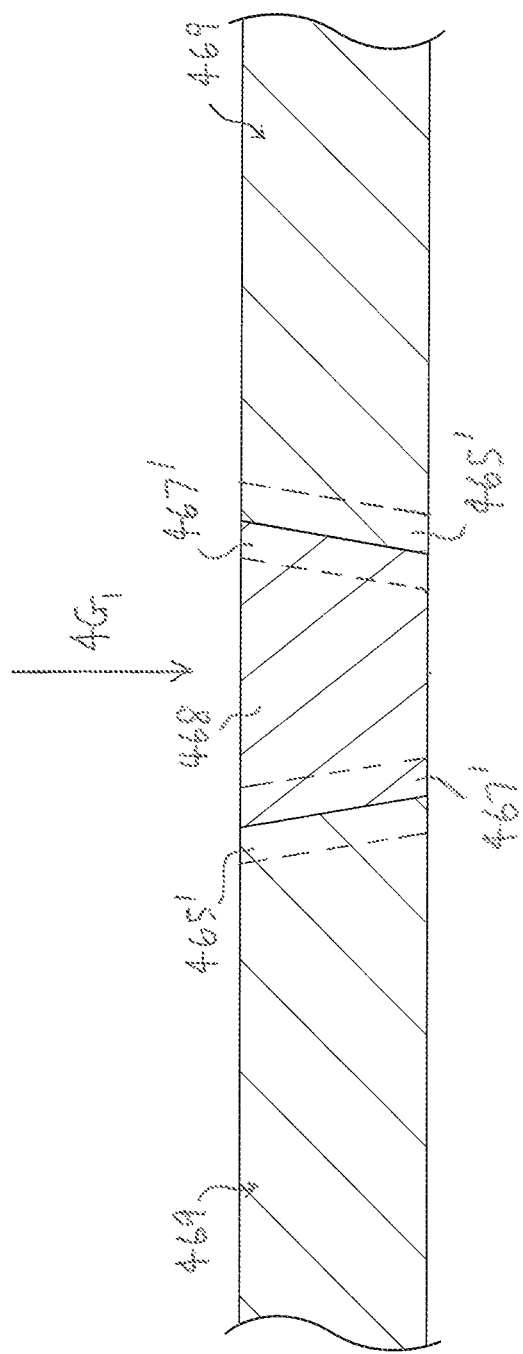
FIG. 6J is a cross-section of the workpiece of FIG. 6H with the plug inserted in the supplementary opening.

It is also preferred that one or more plugs 468 are provided that are metallically bondable with the residual segment 469 (FIGS. 6I, 6J). Each plug 468 preferably is formed to at least partially fit into one of the supplementary openings 462. As will be described, the plug 468 preferably includes one or more plug engagement surfaces 470 (FIG. 6I) that are formed for engagement with the supplementary opening wall surface(s) 466.

Preferably, one or more heating elements 426', 424' are positioned in preselected positions relative to the plug engagement surface 470 and to the supplementary opening wall surface 466 respectively (FIG. 6I). Also, an inert (non-oxidizing) atmosphere preferably is provided, covering the plugs 468, the heating elements, and the residual segment 469. A cover or container for containing the non-oxidizing atmosphere is omitted from the drawings for clarity of illustration.

For clarity, the two supplementary openings are identified in FIG. 6H by reference characters 462A, 462B. In the following description, only one plug 468 and only one of the supplementary openings 462 are described, for clarity. Those skilled in the art would appreciate that the processes for securing plugs 458 in each of the supplementary openings 462 are the same in all relevant respects.

As can be seen in FIG. 6I, in one embodiment, one or more first heating elements 424' preferably are positioned proximal to the supplementary opening wall surface 466 (FIG. 6I). Also, one or more second heating elements 426' preferably are positioned proximal to the plug engagement surface 470 (FIG. 6I).

Next, the heating elements 424', 426' are energized, in the non-oxidizing atmosphere.

With the first heating elements 424', in the non-oxidizing atmosphere, one or more residual segment heated portions 465' are heated to the hot working temperature. Each of the residual segment heated portions 465' extends from the supplementary opening wall surface 466 into the residual segment 469. It will be understood that the residual segment heated portion 465' is plastically deformable at the hot working temperature.

With the second energized heating elements 426', in the non-oxidizing atmosphere, heating a plug heated portion 467' is heated to the hot working temperature. The plug heated portion 467' extends from the plug engagement surface 470 into the plug 468. It will also be understood that the plug heated portion 467' is plastically deformable at the hot working temperature.

Once the residual segment heated portion 465' and the plug heated portion 467' are at the hot working temperature, the heating elements 424', 426' preferably are removed, to enable the plug 468 to be moved to engage the residual segment 469 (FIGS. 6I, 6J).

While the residual segment heated portion 465' and the plug heated portion 467' are at the hot working temperature, the plug 468 preferably is subjected to a secondary engagement motion, to move the plug engagement surface 470 relative to the supplementary opening wall surface 466.

The plug's secondary engagement motion may be any suitable motion thereof, relative to the residual segment 469. For example, the plug 468 may be rotated or oscillated about its axis "4X". Alternatively, the plug 468 may be oscillated in an axial direction.

While the plug 468 is subjected to the secondary engagement motion, and while the residual segment heated portion 465' and the plug heated portion 467' are at the hot working temperature, the plug 468 is additionally subjected to a plug translocation motion to push the plug 468 at least partially into the supplementary opening 462. The direction of the translocation motion is indicated by arrow "4D$_1$" in FIG. 6I.

While the plug 468 is subject to the secondary engagement motion, and while the residual segment heated portion 465' and the plug heated portion 467' are at the hot working temperature, the plug engagement surface 470 is pressed against the supplementary opening wall surface 466, to cause plastic deformation of the residual segment heated portion 465' and of the plug heated portion 467', for creating a metallic bond between the plug 468 and the residual segment 469.

The direction in which pressure is exerted upon the plug 468, in order to press the plug engagement surface 470 against the supplementary opening wall surface 466 is indicated by arrow "4G$_1$" in FIG. 6J.

Subsequently, the plug and the residual segment are allowed to cool, to bond the plug 468 and the residual segment 469 together.

As can be seen in FIG. 6H, in one embodiment, the supplementary opening 462 preferably is round.

Preferably, the plug 468 is a right circular cone. Alternatively, the plug 468 may be frustoconical.

In the embodiment of the method of the invention illustrated in FIGS. 6A-6J, once bonded therein, the first insert 458 substantially occupies the initial opening 412 in the workpiece 410. However, those skilled in the art would appreciate that, where the initial opening 412 is relatively long, maintaining a suitable engagement motion of the insert 458 may not be practical, e.g., due to the length of the initial opening 412. For example, a large pipe made of relatively thick rolled metal (e.g., such as the prior art example illustrated in FIG. 1A) may be several feet long, with a correspondingly long opening therein, along all or part of its length. Also, where the opening to be filled is not generally straight (i.e., non-linear), it may not be feasible to utilize a single insert to occupy most of the opening. An embodiment of the method of the invention intended to address these situations is illustrated in FIGS. 7A-7F.

It will be understood that the embodiment of the method of the invention illustrated in FIGS. 7A-7F may be utilized to complete or finish a workpiece, or to repair a damaged or worn workpiece.

Figure 7A:
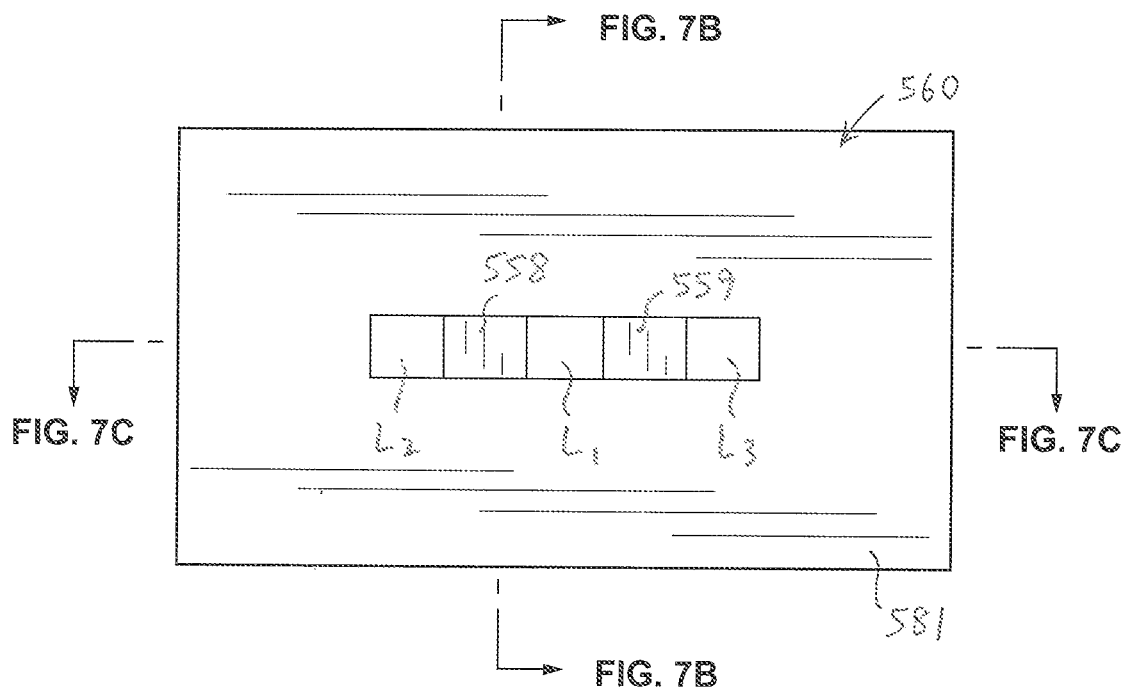
FIG. 7A is a plan view of another incomplete workpiece, drawn at a smaller scale.

A partially-modified or incomplete workpiece 560 is illustrated in FIG. 7A. A body portion 581 of the workpiece is shown, the body portion being the portion of the workpiece that defines an initial opening in the body portion 581.

Figure 7B:
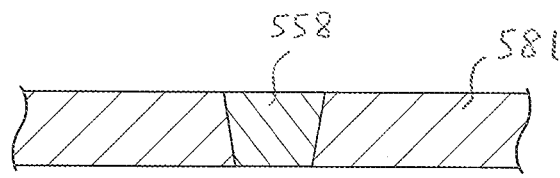
FIG. 7B is a cross-section of the incomplete workpiece of FIG. 7A.
Figure 7C:
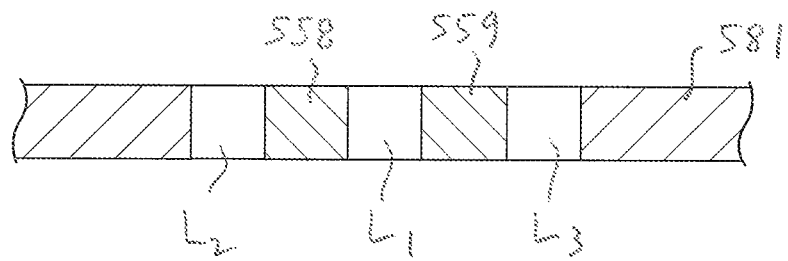
FIG. 7C is another cross-section of the incomplete workpiece of FIG. 7A.

First inserts 558, 559 are secured to the body portion 581 (FIG. 7A). As illustrated in FIG. 7A, the initial opening in the incomplete workpiece 560 is partially occupied by left and right first inserts 558, 559 (as shown in FIG. 7A), which are spaced apart from each other by an unfilled part "L$_1$" of the original (initial) opening. The incomplete workpiece 560 includes the body portion 581, and the left and right first inserts 558, 559. The left and right first inserts 558, 559 also define unfilled parts "L$_2$", "L$_3$" at their respective ends. The unfilled parts "L$_1$", "L$_2$", and "L$_3$" are parts of the initial or original opening in the workpiece that remain unoccupied after the left and right first inserts 558, 559 are bonded to the body portion 581 (FIGS. 7A-7C).

It will be understood that the left and right first inserts 558, 559 preferably are bonded with the body portion 581 using any suitable embodiment of the method of the invention described above, e.g., such as the method used in connection with bonding the first insert 458 to the remaining portion 456 (FIGS. 6C-6E). Those skilled in the art would appreciate that the left and right first inserts 558, 559 are not required to be bonded simultaneously with the body portion 581. It is expected that, due to space constraints, bonding one of the first inserts with the body portion 581, and then subsequently bonding the other first insert with the body portion 581, is likely to be preferred in practice.

Because the method of bonding the first inserts 558, 559 with the body portion 581 is described above, further description thereof is unnecessary. The heating elements and other elements needed for bonding the left and right first inserts 558, 559 with the body portion 581 are omitted from FIGS. 7A-7C for clarity of illustration. It will be understood that some extruded material (not shown) may be extruded into the unfilled parts "L$_1$"-"L$_3$".

It will also be understood that only two first inserts 558, 559 are illustrated in order to simplify the illustration. However, those skilled in the art would appreciate that there may be any suitable number of first inserts, with a corresponding number of unfilled parts of the initial opening therebetween, depending on (among other things) the overall length of the initial opening that is to be partially filled, and the shape thereof.

Figure 7D:
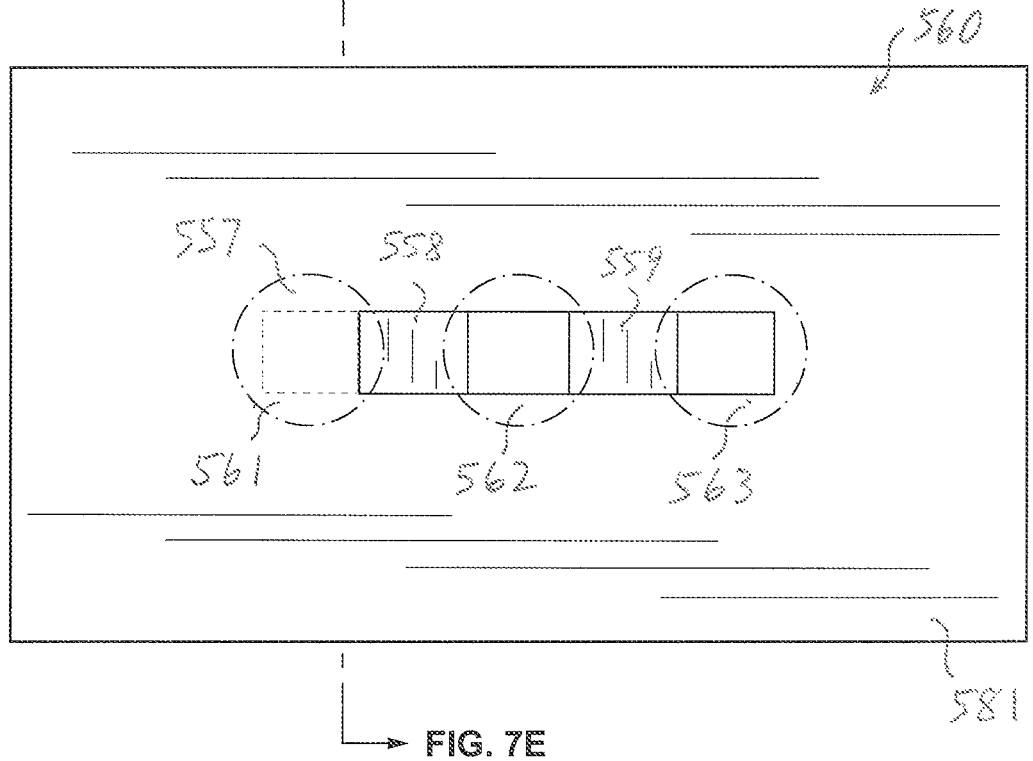
FIG. 7D is a plan view of the incomplete workpiece of FIG. 7A with locations of supplementary openings to be formed therein, drawn at a smaller scale.

In order to fill the unfilled parts "L$_1$"-"L$_3$" of the initial opening, supplementary openings 561, 562, and 563 preferably are formed in the incomplete workpiece 560 (FIG. 7D). Dashed lines in FIG. 7D show the locations of the supplementary openings. The locations of the respective supplementary openings 561, 562, 563 are shown in FIG. 7D. The supplementary openings 561, 562, 563 may be formed in any suitable manner, and may involve removal of material from the workpiece 560. In one embodiment, the method preferably includes removing one or more peripheral regions 557 from the body portion 581 to form one or more supplementary opening walls having one or more supplementary opening wall surfaces 566 thereon defining the one or more supplementary openings 561, 562, 563, producing a residual segment 569 of the body 581 (FIG. 7F). The supplementary openings 561, 562, 563 are in the residual segment 569.

In the examples illustrated in FIG. 7D, the peripheral regions 557 are removed from the partially-modified workpiece 560 in order to provide respective supplementary openings that are round, in plan view. As will be described, this shape of the supplementary opening may facilitate an engagement motion of each plug to be inserted therein, thereby facilitating bonding or fusing plugs with the residual segment 569.

As can be seen in FIG. 7D, for instance, the supplementary opening 561, once formed, encompasses the unfilled part "L$_2$". The other supplementary openings 562, 563 preferably encompass or include or incorporate the unfilled parts "L$_1$" and "L$_3$" respectively.

Plugs 568 preferably are provided that are bondable or fusible with the metal of the body portion 581, and with the metal of the left and right first inserts 558, 559 (as illustrated in FIG. 7D). The plugs 568 preferably are formed to fit into each of the supplementary openings 561, 562, 563 respectively. For clarity of illustration, in FIG. 7F, the plugs that are shown located in the supplementary openings 561, 562, 563 are identified by reference characters 568A, 568B, and 568C respectively.

Figure 7E:
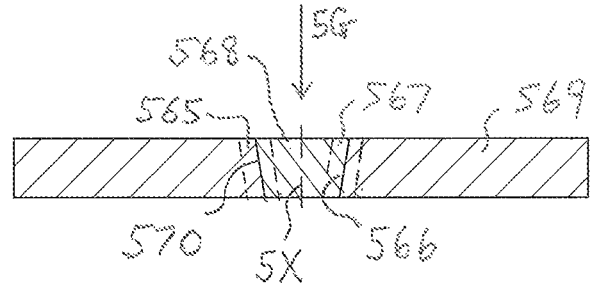
FIG. 7E is a cross-section of a residual segment of the incomplete workpiece of FIG. 7D with a plug located in one of the supplementary openings.
Figure 7F:
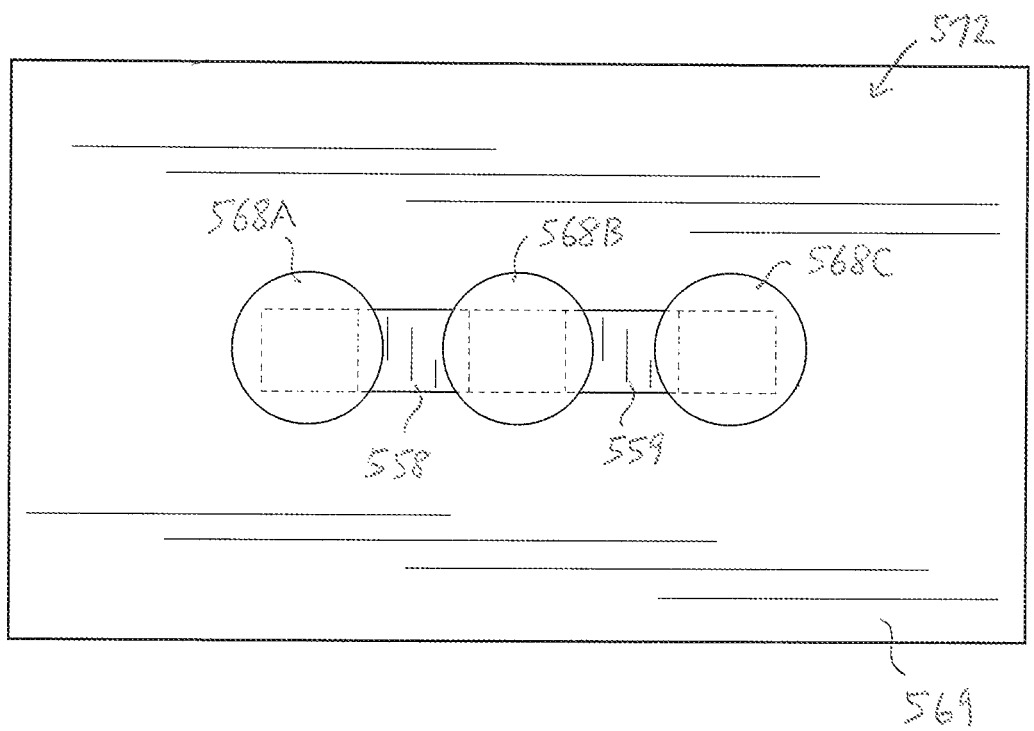
FIG. 7F is a plan view of the residual segment of FIGS. 7A-7E, with plugs located in the supplementary openings.

One of the plugs 568 is shown positioned in one of the supplementary openings in FIG. 7E. Each of the supplementary openings 561, 562, 563 preferably is at least partially defined by the supplementary opening wall surface 566 therefor (FIG. 7E). Also, each of the plugs 568 preferably is partially defined by one or more insert engagement surfaces 570 thereof (FIG. 7E) that are formed for engagement with the supplementary opening wall surface 566 of the one of the supplementary openings 561, 562, 563, in which the plug 568 is to be positioned. As an example, one of the plugs 568 is shown in the supplementary opening 561 (FIG. 7E).

It will also be understood that certain of the heating elements (not shown) are positioned proximal to the respective plugs, and energized to heat the respective plug heated portions. The non-oxidizing atmosphere covers the heating elements, the plug, and the residual segment. The heating elements and a cover or container for containing the non-oxidizing atmosphere are omitted from the drawings for clarity of illustration.

Preferably, residual segment heated portions 565 are heated by heating elements (not shown), in a non-oxidizing atmosphere, to the hot working temperature, in the same manner as described above. It will be understood that certain of the heating elements (not shown) are positioned in the respective supplementary openings, and energized to heat the respective residual segment heated portions. Also, plug heated portions 567 are heated to the hot working temperature by the heating elements, in the non-oxidizing atmosphere.

Each of the residual segment heated portions 565 preferably extends from the supplementary opening wall surface 566 into the residual segment 569. Similarly, each of the plug heated portions 567 preferably extends from the plug engagement surface 570 into the plug 568.

For clarity of illustration, only the residual segment heated portion 565 that is proximal to the supplementary opening 561 and the plug heated portion 567 in the plug 568 located in that supplementary opening are shown in FIG. 7E.

In order to simplify the description, only one plug and one supplementary opening is described. It will be understood that the plugs are the same, and the supplementary openings and the supplementary opening walls are the same, in all relevant respects.

When the modified workpiece heated portion 565 and the plug heated portion 567 are heated to the hot working temperature, each of them is plastically deformable.

Preferably, the plug 568 is subjected to a second engagement motion, to move the plug engagement surface 570 relative to the supplementary opening wall surface 566. While the plug 568 is subjected to the second engagement motion, and while the plug engagement surface 570 and the supplementary opening wall surface 566 are at the hot working temperature, the plug 568 preferably is also additionally subjected to a second translocation motion, to move the plug 568 at least partially into the supplementary opening therefor, for engaging the plug engagement surface 570 with the supplementary opening wall surface 566 thereof.

Once the plug engagement surface 570 engages the supplementary opening wall surface 566, the second engagement motion preferably continues, until the plug 568 and the residual segment 569 are bonded or fused together.

Preferably, the plug engagement surface 570 is pressed against the supplementary opening wall surface 566, while the second engagement motion continues, and also while the residual segment heated portion 565 and the plug heated portion 567 are at the hot working temperature, to cause plastic deformation of the residual segment heated portion 565 and of the plug heated portion 567 as they engage each other, for creating a metallic bond between the plug 568 and the residual segment 569.

In FIG. 7E, for example, one of the plugs 568 is shown located in one of the supplementary openings 561 and bonded with the residual segment 569. It will be understood that the plug 568 is pressed in the direction indicated by arrow "5G" in FIG. 5E, to press the plug engagement surface 570 against the supplementary wall opening surface 566 while the plug 568 is subjected to the second engagement motion.

It is also preferred that the plugs 568 and the residual segment 569 are subsequently allowed to cool, to form a modified workpiece 572 (FIG. 7F) that includes the plugs 568 (i.e., one plug 568 being located in each of the supplementary openings 561, 562, 563 respectively) and the residual segment 569.

In the example illustrated in FIG. 7F, there are three supplementary openings 561, 562, and 563, and three plugs 568 are bonded or fused to the residual segment 569 in the three supplementary openings 561, 562, and 563 respectively. Accordingly, once the plugs 568 are in the supplementary openings 561, 562, and 563, the workpiece is completed, and may be utilized.

The plug 568 may be a right circular cone. In one embodiment, the plug 568 is frustoconical (FIG. 7E). The engagement motion may be a rotational or oscillating motion of the plug 568, about its axis "5X". Alternatively, the plug may be axially oscillated. As noted above, each supplementary opening preferably is round in plan view.

It will be understood that the number, size and shape of the supplementary openings may be any suitable number, size and shape, as required in order to fill the unfilled parts (e.g., "$L_1$", "$L_2$", "$L_3$") of the initial opening. The inserts 558, 559 and the plug 568 may have any suitable configurations also. The process may involve any suitable number of first inserts, and therefore also may involve any suitable number of supplementary openings and plugs.

Those skilled in the art would appreciate that the embodiment of the method illustrated in FIGS. 7A-7F may also be utilized to fill unfilled parts of initial openings in the workpiece that are not elongate and straight. For example, such embodiment may be utilized to fill an elongate opening that is not linear (i.e., straight) along its length, but is instead non-linear. This may be accomplished by dividing the elongate non-linear opening into a series of smaller linear segments, each linear segment being filled by one or more first inserts and one or more plugs, as described above.

From the foregoing, it can be seen that the embodiment of the method of the invention illustrated in FIGS. 7A-7F results in the completed or repaired workpiece 572 (FIG. 7F), in which the replacement of the damaged region has been effected without creating heat-affected zones in the completed workpiece 572.

It will also be understood that the translocation motion of the first inserts and the plugs may, alternatively, be directed radially outwardly from the interior of the pipe or tube workpiece toward its exterior, where the relevant elements are formed to accommodate this.

Those skilled in the art would appreciate that such method (and other embodiments of the method of the invention described herein) may be utilized in situ, e.g., where the workpiece cannot be moved, or at least cannot conveniently be moved.

Figure 8A:
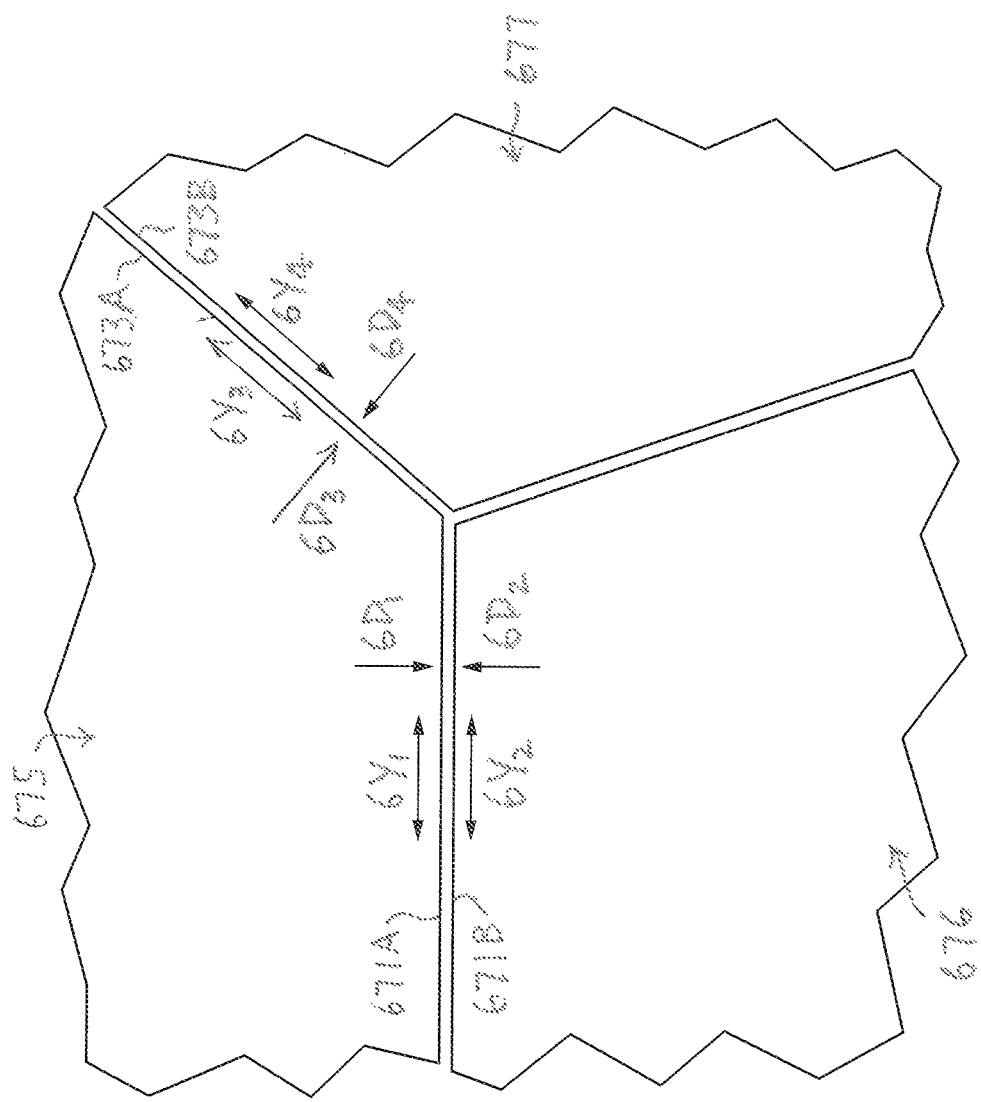
FIG. 8A is a top view of three plates positioned to be secured together.

As can be seen, e.g., in FIG. 8A, it may be desirable to bond a number of plates together. In the example illustrated in FIGS. 8A-8J, three plates 675, 676, 677 are bonded or fused together. It will be understood that the plates may be flat, concave, convex, or combinations thereof. The plates 675, 676, 677 may be secured together, for instance, to form a structure, or to form part of a structure.

Figure 8B:
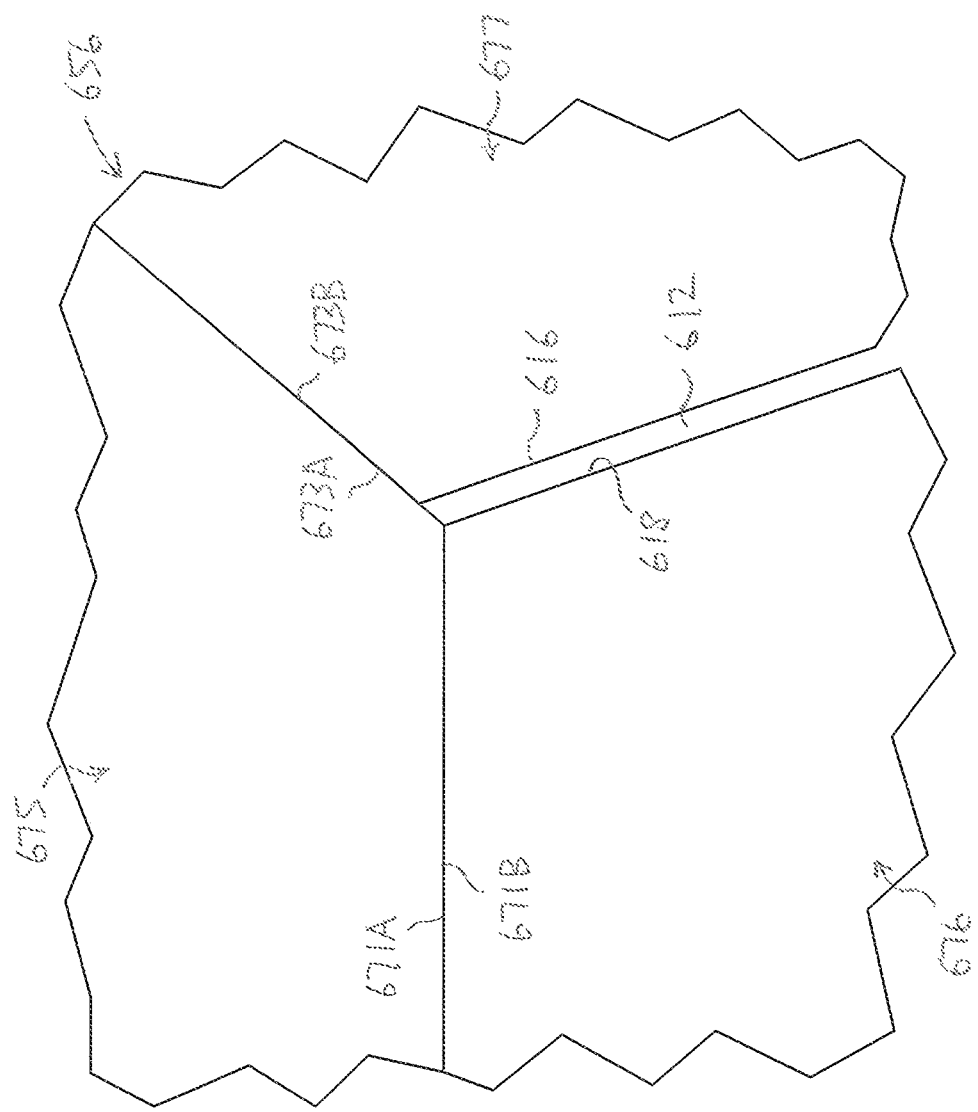
FIG. 8B is a top view of the plates of FIG. 8A in which the plates are partially secured together to form an intermediate segment with an initial opening therein.

In one embodiment, the method of the invention is for securing a number of the plates together to form a structure 672 (FIG. 8H). The method preferably includes, first, securing two or more of the plates 675, 676, 677 to produce an intermediate segment 656 of the structure 672 having an initial opening 612 therein (FIG. 8B). As an example, in FIGS. 8A and 8B, the plates 675, 676 are shown secured along their respective adjacent edges 671A, 671B. Also, the plates 675, 677 are shown as being secured to each other along respective adjacent edges 673A, 673B. As can be seen in FIG. 8B, in this example, the three plates 675, 676, 677 form the intermediate segment 656 of the structure, which defines the initial opening 612 therein between the plates 676, 677.

The opening 612 is formed because, once the plates 675, 676, 677 have been secured together, two of the three plates (i.e., the plates 676, 677, in the example illustrated in FIG. 8B) are not thereafter movable relative to each other, to close the initial opening 612. Preferably, the plates 675, 676, 677 are bonded or fused together utilizing techniques described above.

For example, it will be understood that the plates 675, 676 may be bonded together by, first, heating heated portions thereof (not shown) that are adjacent to the edges 671A, 671B of the plates in a non-oxidizing atmosphere. The heated portions are heated by heating elements (not shown) to the hot working temperature. The heating may be, for example, by induction. Once the heated portions are at the hot working temperature, at which they are subject to plastic deformation, one or both of the plates 675, 676 may be moved relative to the other, in an engagement motion. Arrows "$6Y_1$", "$6Y_2$" schematically represent such motion (FIG. 8A). While the heated portions are at the hot working temperature, and while one or both of the plates 675, 676 are subjected to the engagement motion, the edges 671A, 671B are pushed together, as indicated by arrows "$6D_1$" and "$6D_2$" (FIG. 8A), to bond the plates 675, 676 together along their respective edges 671A, 671B. The engagement motion continues while the edges 671A, 671B are pressed together, until the plates 675, 676 are bonded or fused together.

Similarly, in the example illustrated in FIG. 8A, heated portions (not shown) of the plates 675, 677 that are adjacent to the edges 673A, 673B of the plates 675, 677 are heated in a non-oxidizing atmosphere to the hot working temperature by heating elements (not shown). One or both of the plates 675, 677 are subjected to an engagement motion, schematically represented by arrows "$6Y_3$", "$6Y_4$". The edges 673A, 673B preferably are pushed together, as indicated by arrows "$6D_3$", "$6D_4$", to bond the plates 675, 677 together along the edges 673A, 673B.

It will be understood that a number of elements utilized in connection with joining the plates together (e.g., heating elements, and a cover or container for containing the non-oxidizing atmosphere) are omitted from the drawings, for clarity of illustration.

Because embodiments of the method of the invention used in joining the plates 675, 676, 677 together to form the intermediate segment 656 are described above, further description thereof is unnecessary.

In the example illustrated in FIGS. 8A and 8B, the foregoing steps result in the plates 675, 676, 677 forming the intermediate segment 656, having the initial opening 612 therein. Preferably, the intermediate segment 656 includes one or more opening walls 616 at least partially around the initial opening 612 (FIG. 8B). The opening walls 616 have opening wall surfaces 618 thereof, defining the initial opening 612 (FIG. 8D).

Figure 8C:
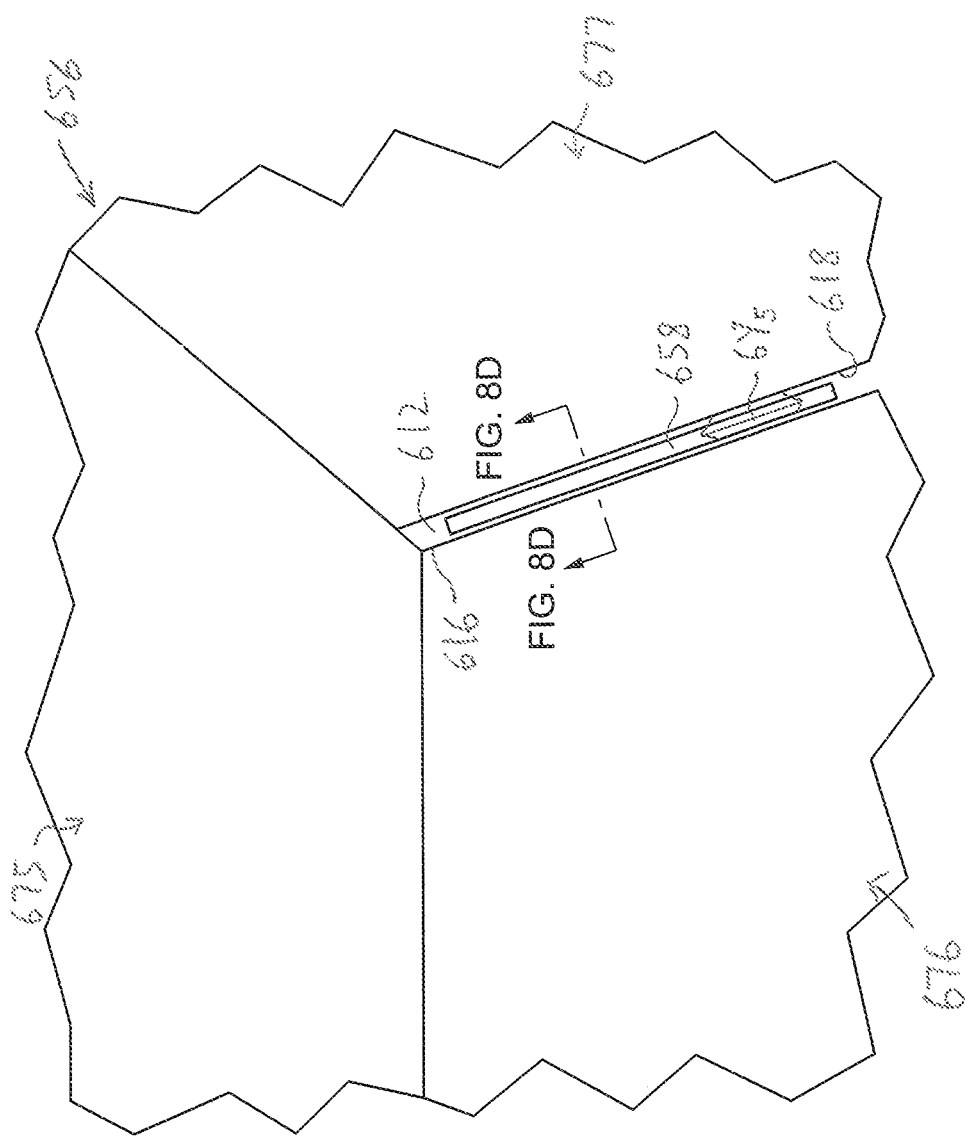
FIG. 8C is a top view of the plates of FIG. 8B in which an elongate insert is positioned in the initial opening in the intermediate segment.

It is preferred that an insert 658 that is metallically bondable with the intermediate segment 656 is provided (FIG. 8C). The insert 658 preferably is formed to at least partially fit into the initial opening 612. In the example illustrated in FIGS. 8B and 8C, the initial opening 612 is elongate, and the insert 658 is also elongate, to fit therein. Preferably, the insert 658 has an insert engagement surface 652 formed for engagement with the opening wall surfaces 618 (FIG. 8D).

Figure 8D:
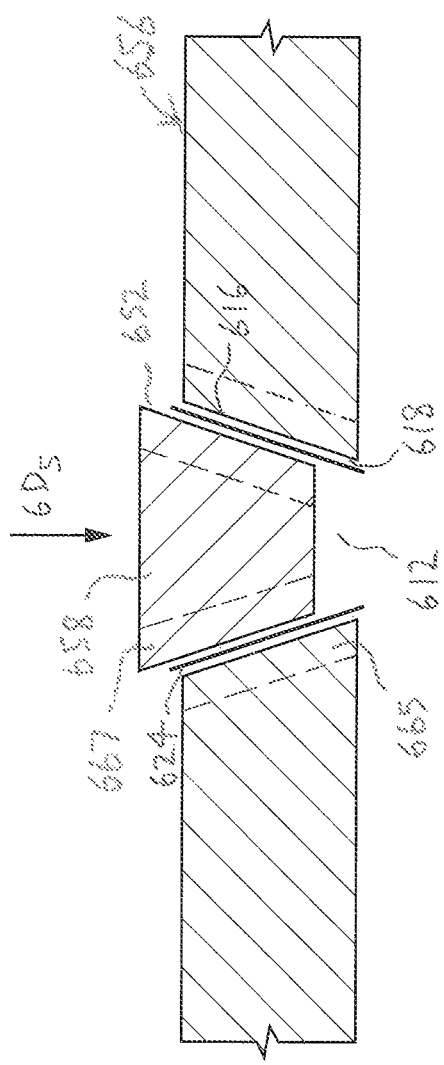
FIG. 8D is a cross-section of the insert positioned to be inserted into the initial opening, drawn at a larger scale.
Figure 8E:
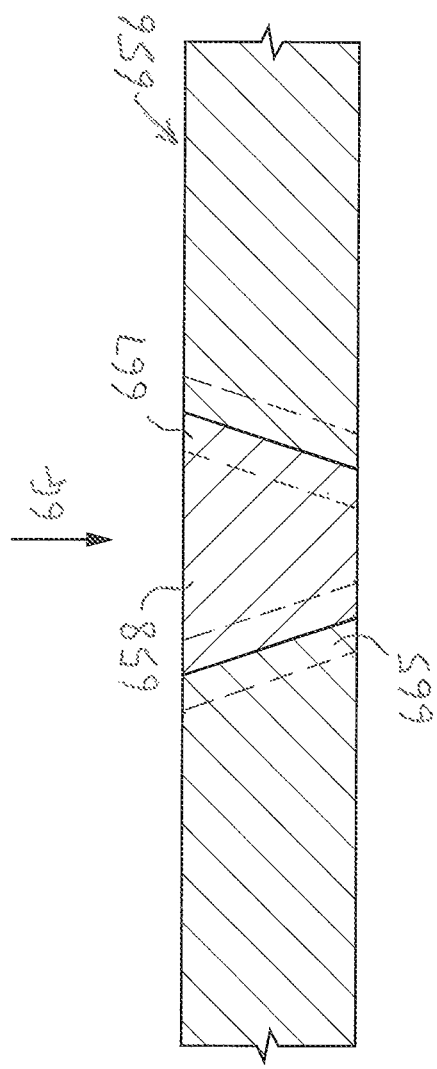
FIG. 8E is a cross-section of the insert positioned in the initial opening.

As can be seen in FIG. 8D, one or more heating elements 624 preferably are positioned in predetermined positions relative to the insert engagement surface 652 and to the opening wall surface 618. It will be understood that certain elements are omitted from the drawings for clarity, and separate heating elements may be used to heat the insert 658 and the opening walls 616 respectively.

A non-oxidizing atmosphere preferably is provided that covers the heating elements and at least the portions of the insert 658 and the intermediate segment 656 that are to be heated. It will be understood that a cover or container for holding the non-oxidizing atmosphere in position is omitted from the drawings, for clarity of illustration.

Next, the heating elements are energized in the non-oxidizing atmosphere. With the one or more energized heating elements, an intermediate segment heated portion 665 is heated to the hot working temperature. The intermediate segment heated portion 665 is plastically deformable at the hot working temperature. As can be seen in FIG. 8D, the intermediate segment heated portion 665 extends from the opening wall surfaces 618 into the intermediate segment 656.

With the one or more energized heating elements, an insert heated portion 667 is heated to the hot working temperature, at which the insert heated portion 667 is plastically deformable. As can also be seen in FIG. 8D, the insert heated portion 667 extends from the insert engagement surface 652 into the insert 658.

Next, while the intermediate segment heated portion 665 and the insert heated portion 667 are at the hot working temperature, the insert 658 is subjected to an insert engagement motion, to move the insert engagement surface 652 relative to the opening wall surface 618. The insert engagement motion may be any suitable motion. As can be seen in FIG. 8C, in one embodiment, the insert 658 may be elongate, to fit into the opening 612. In the example illustrated, the engagement motion may be an oscillation of the insert 658, in the directions indicated by arrow "$6Y_5$" (FIG. 8C).

Preferably, while the insert 658 is subject to the engagement motion, and while the insert heated portion 667 and the intermediate segment heated portion 665 are at the hot working temperature, the insert 658 is subjected to a translocation motion to push the insert 658 at least partially into the opening 612. The translocation motion of the insert 658 is indicated by arrow "$6D_5$" in FIGS. 8D and 8E.

While the insert 658 is subject to the engagement motion, and while the insert heated portion 667 and the intermediate segment heated portion 665 are at the hot working temperature, the insert engagement surface 652 preferably is pressed against the opening wall surface 618, to cause plastic deformation of the intermediate segment heated portion 665 and also of the insert heated portion 667, for creating a metallic bond between the insert 658 and the intermediate segment 656. The insert 658 is pressed in the direction indicated by arrow "6G" in FIG. 8E. The insert 658 and the intermediate segment 656 are then allowed to cool, to bond the insert 658 and the intermediate segment 656 together.

Figure 8F:
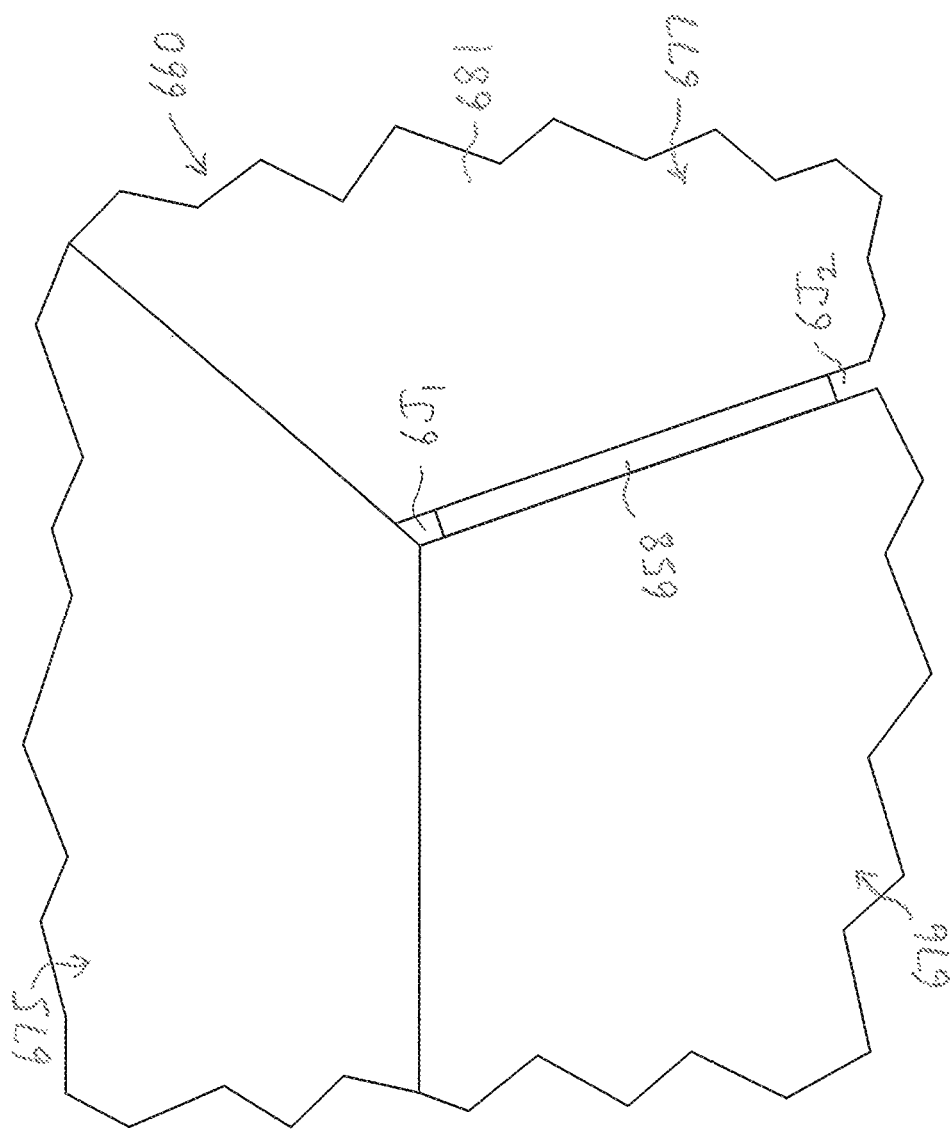
FIG. 8F is a top view of the insert positioned in the initial opening to form a residual segment, the insert defining unfilled parts of the initial opening, drawn at a smaller scale.

As can be seen in FIG. 8F, due to the oscillation of the insert 658, when the insert 658 is fused or bonded with the intermediate segment 660, the insert 658 does not fully occupy the opening 612. In FIG. 8F, the insert 658 is bonded with the intermediate segment 656, and unfilled parts "$6J_1$" and "$6J_2$" of the initial opening 612 that are vacant or unfilled are defined at the respective ends of the insert 658. The unfilled parts "$6J_1$" and "$6J_2$" remain open once the insert 658 is bonded or fused with the intermediate segment 656. The intermediate segment 656 and the insert 658, once bonded together, form a body 681 of an incomplete workpiece 660. The incomplete workpiece 660 includes the body 681 and the unfilled parts "$6J_1$", "$6J_2$" (FIG. 8F).

In order to complete the incomplete workpiece 660, the unfilled parts "$6J_1$", "$6J_2$" of the initial opening 612 preferably are filled, as will be described. Preferably, additional material is removed from one or more peripheral regions 657 of the body 681 at least partially around the unfilled parts "$6J_1$", "$6J_2$", to form one or more supplementary opening walls 664, producing a residual segment 669 of the body 681. For clarity of illustration, the locations of the supplementary opening walls, identified by reference character 664', are shown in FIG. 8G in dashed lines.

The supplementary opening wall 664 has a supplementary opening wall surface 666 defining a supplementary opening 662 (FIG. 8I). Each of the supplementary openings 662 preferably includes or encompasses or incorporates the one or more unfilled parts "$6J_1$", "$6J_2$".

Figure 8G:
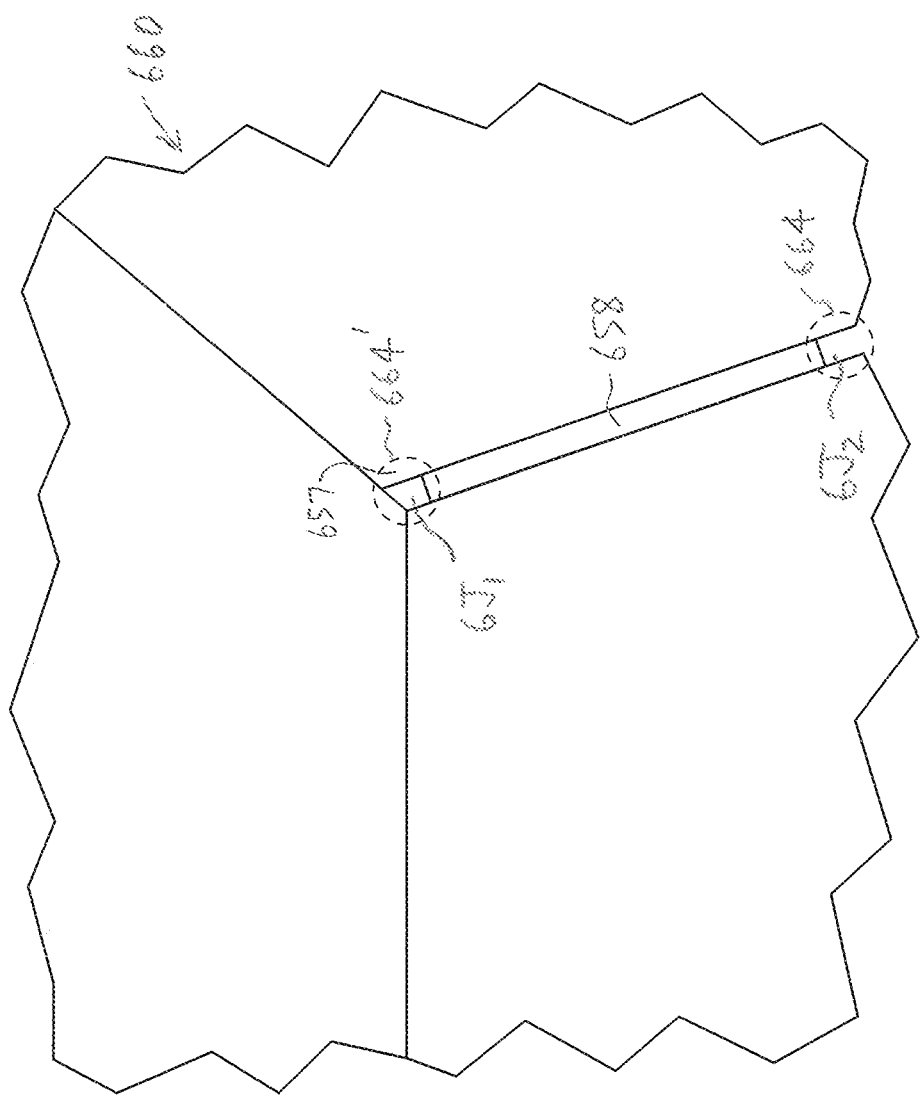
FIG. 8G is a top view of the residual segment of FIG. 8F in which the locations of supplementary openings respectively coinciding with the unfilled parts of the initial opening are outlined.

In the example illustrated in FIG. 8G, there are two supplementary openings 662, each of which encompasses one of the parts "$6J_1$", "$6J_2$" of the initial opening 612 respectively. Those skilled in the art would appreciate that the supplementary openings 662 may be formed using any suitable tools.

In one embodiment, each supplementary opening 662 preferably is defined by one or more supplementary opening walls 664 that are at least partially formed in the insert 658. As can be seen in FIG. 8G, one of the supplementary openings 662, coinciding with the unfilled part "$6J_1$", is defined by an opening wall 664 that is partly formed in the insert 658 and also formed in each of the plates 675, 676, and 677. The other supplementary opening 662 coincides with the unfilled part "$6J_2$" (FIG. 8G). Each of the supplementary opening walls 664 has one or more supplementary opening wall surfaces 666 (FIG. 8I). As will be described, it is preferred that the supplementary openings 662 are round in plan view. Accordingly, to form the supplementary openings 662, one or more peripheral regions 657 are removed from the body 681 of the incomplete workpiece 660 to produce the residual segment 669 (FIG. 8G).

To simplify the description, only one plug and its movement into only one supplementary opening is described.

Preferably, the plug 668 is metallically bondable with the residual segment 669. The plug 668 is formed to at least partially fit into the supplementary opening 662. The plug has a plug engagement surface 670 formed for engagement with the supplementary opening wall surface 666.

As can be seen in FIG. 8I, one or more heating elements 624 preferably are positioned in a preselected position relative to the plug engagement surface 670 and to the supplementary opening wall surface 666. As described above, a non-oxidizing atmosphere is provided, covering the plug, the heating elements, and the residual segment 669. Next, the one or more heating elements 624 are energized.

With the one or more energized heating elements 624, the residual segment heated portion 678 is heated in the non-oxidizing atmosphere to a hot working temperature, at which the residual segment heated portion 678 is plastically deformable. The residual segment heated portion 678 extends from the supplementary opening wall surface 666 into the residual segment 669.

With the one or more energized heating elements 624, a plug heated portion 679 is heated in the non-oxidizing atmosphere to the hot working temperature, at which the plug heated portion 670 is plastically deformable. The plug heated portion 679 extends from the plug engagement surface 670 into the plug 668.

Next, while the residual segment heated portion 678 and the plug heated portion 679 are at the hot working temperature, the plug 668 preferably is subjected to a secondary engagement motion, to move the plug engagement surface 670 relative to the supplementary opening wall surface 666.

While the plug 668 is subjected to the secondary engagement motion, and while the residual segment heated portion 678 and the plug heated portion 679 are at the hot working temperature, the plug 668 is additionally subjected to a plug translocation motion to push the plug 668 at least partially into the supplementary opening 662, in the direction indicated by arrow "$6D_6$" in FIG. 8I.

While the plug 668 is subject to the secondary engagement motion, and while the residual segment heated portion 678 and the plug heated portion 679 are at the hot working temperature, the plug engagement surface 670 is pressed against the supplementary opening wall surface 666, to cause plastic deformation of the residual segment heated portion 678 and the plug heated portion 679 for creating a metallic bond between the plug 668 and the residual segment 669. The direction in which the plug 668 is pressed is indicated by arrow "$6G_1$" in FIG. 9J.

The plug 668 and the residual segment 669 are allowed to cool, to bond the plug 668 and the residual segment 669 together.

It will be understood that the secondary engagement motion may be, for example, rotation of the plug 668 about its axis "6X", or oscillation about the axis (FIG. 8I). Preferably, the secondary engagement motion is an oscillation. The secondary engagement motion may involve motion in the axial direction.

Figure 9A:
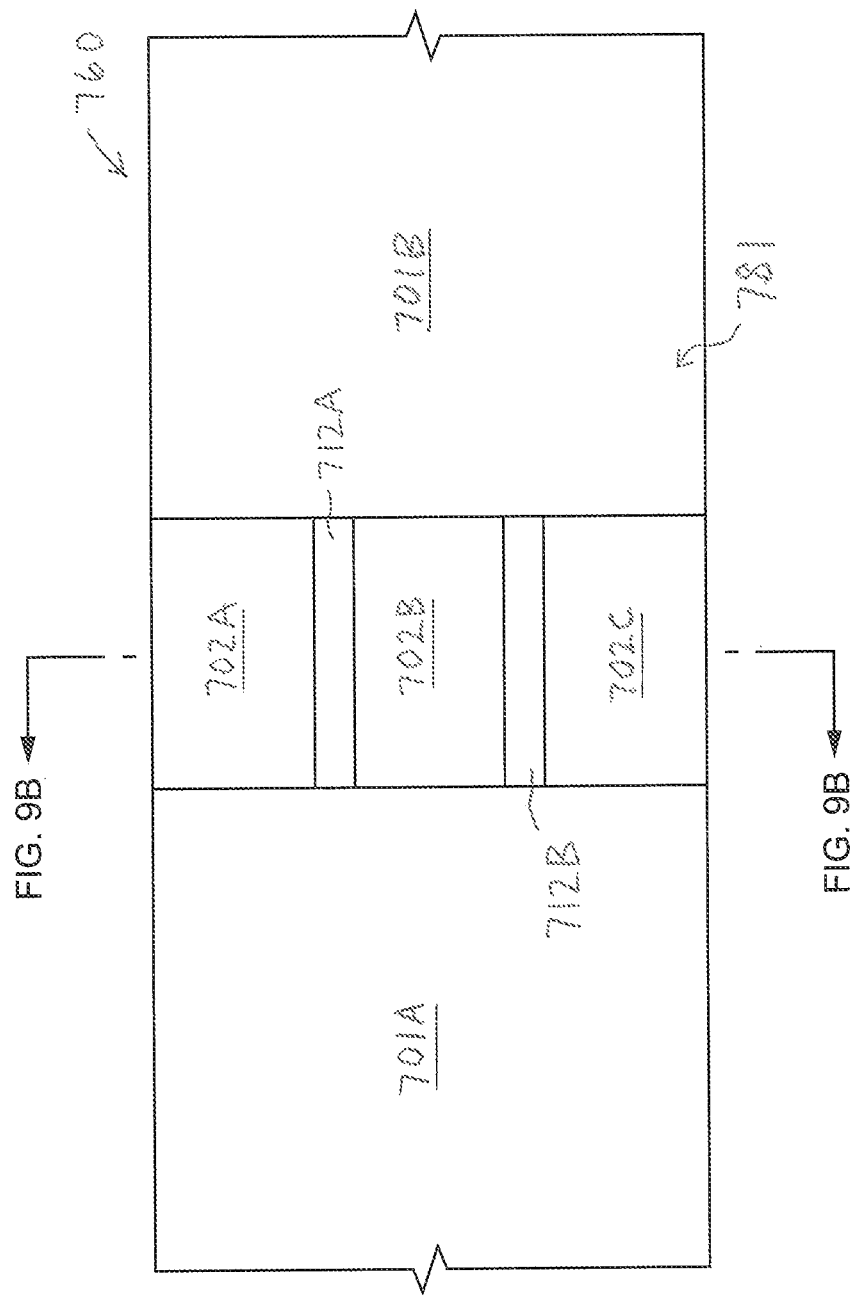
FIG. 9A is a side view of an incomplete workpiece in which tubes are partially joined by first inserts to define initial openings therebetween in a body of the incomplete workpiece, drawn at a smaller scale.
Figure 9B:
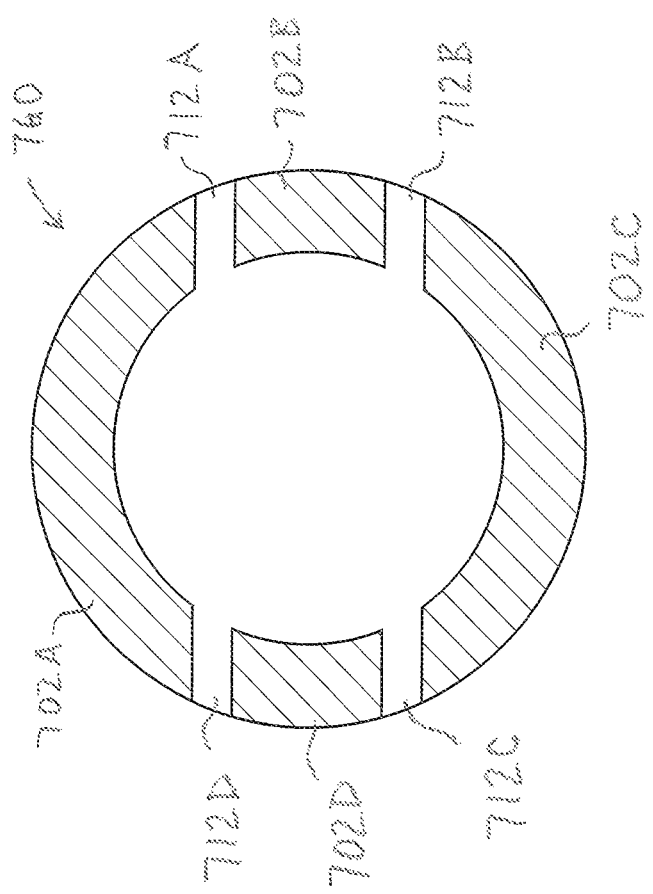
FIG. 9B is a cross-section of the incomplete workpiece of FIG. 9A showing the first inserts and the respective initial openings therebetween, drawn at a larger scale.

Another situation in which relatively large objects may be secured together by utilizing the method of the invention is illustrated in FIGS. 9A-9E. An incomplete workpiece 760 is illustrated in FIGS. 9A and 9B. The incomplete workpiece 760 includes a body 781 that includes two tubes 701A, 701B (FIG. 9A) that are connected by first inserts 702A, 702B, 702C, and 702D (FIGS. 9A, 9B).

It will be understood that the first inserts 702A, 702B, 702C, and 702D may be bonded to the respective tubes 701A, 701B using embodiments of the method of the invention described above. As can be seen in FIGS. 9A and 9B, the first inserts 702A, 702B, 702C, and 702D define respective initial openings 712A, 712B, 712C, and 712D therebetween. Because embodiments of the method of the invention used in joining the first inserts 702A-702D to the tubes 701A, 701B are described above, further description thereof is unnecessary.

Figure 9C:
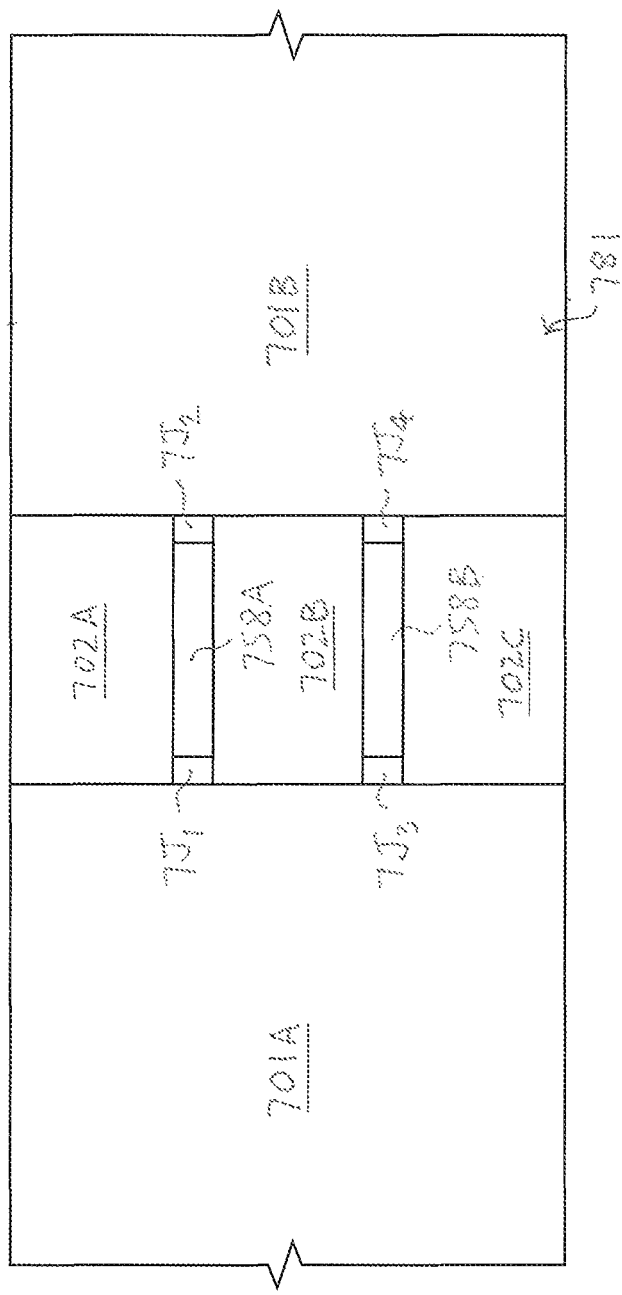
FIG. 9C is a side view of the incomplete workpiece of FIGS. 9A and 9B in which elongate second inserts are positioned in selected ones of the initial openings, defining holes in the body of the incomplete workpiece.
Figure 9D:
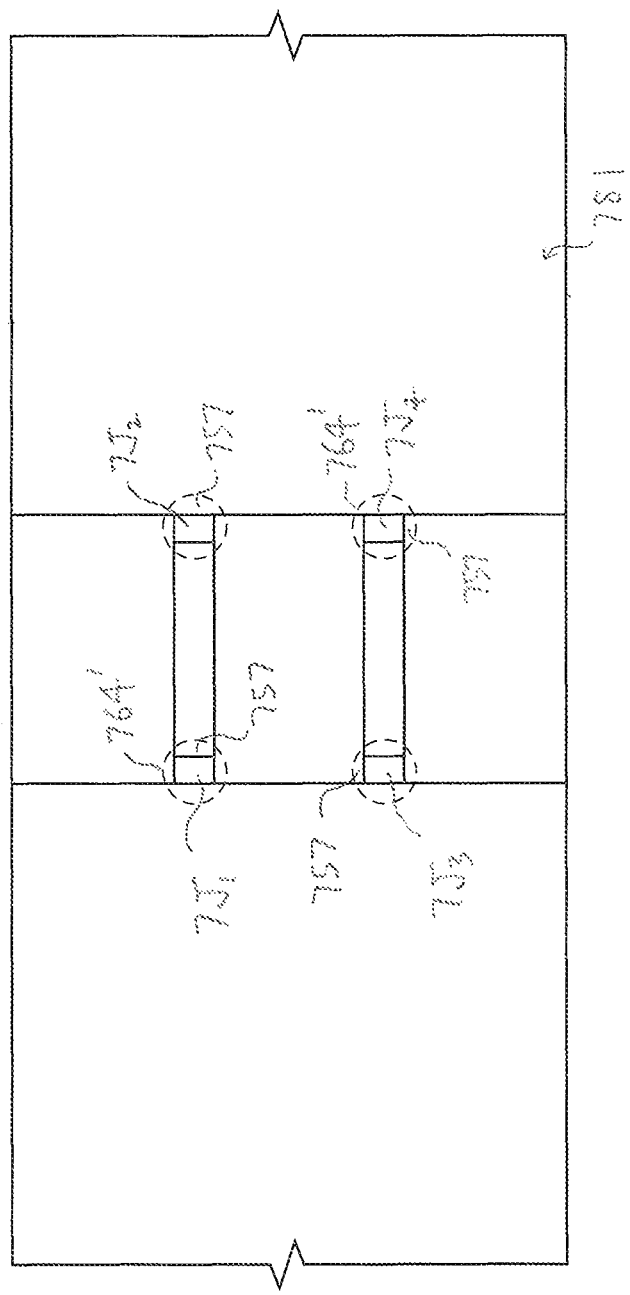
FIG. 9D is a side view of the incomplete workpiece of FIG. 9C in which the locations of supplementary openings coinciding with the holes are outlined.

As can be seen in FIG. 9C, it is preferred that second inserts are positioned in all four of the initial openings, to partially fill the respective initial openings. Only two of the second inserts, 758A, 758B, are shown in FIG. 9C, for clarity of illustration. It can be seen in FIG. 9C that the second inserts 758A, 758B partially fill the initial openings 712A, 712B respectively.

It will also be understood that the second insert 758A preferably is bonded or fused with the first inserts 702A, 702B, and the second insert 758B preferably is bonded to the first inserts 702B, 702C, by utilizing embodiments of the invention described above. Because embodiments of the method of the invention used in bonding the second inserts to the first inserts are described above, further description thereof is unnecessary.

As can be seen in FIG. 9C, the body 781 of the incomplete workpiece 760 and the second inserts define holes therein, i.e., unfilled parts of the initial openings 712A-712D. It will be understood that only the holes or unfilled parts "$7J_1$"-"$7J_4$" are illustrated, for clarity of illustration (FIG. 9C).

Next, supplementary opening walls 764 are formed (FIG. 9F), to define supplementary openings 762 that encompass or coincide with the holes. The supplementary opening walls 764 preferably are formed by removing peripheral regions 757 from the body 781. As examples, the locations of the supplementary opening walls formed around the holes "7J"-"7J" are shown in dashed lines in FIG. 9D, identified by reference character 764'.

In the following description, the utilization of an embodiment of the invention to fill only one of the unfilled parts is described. For the purposes of discussion, the description is related to filling the unfilled part identified by reference character "$7J_1$". It will be understood that the steps taken to fill the unfilled part "$7J_1$" are the same as the steps taken to fill each other unfilled part respectively.

In one embodiment, the method of completing the incomplete workpiece 710 includes removing the peripheral regions 757 from the body 781 to form one or more supplementary opening walls 764 at least partially around the unfilled part of the initial opening to produce a residual segment 769 of the body 781 (FIG. 9F). The supplementary opening wall 764 includes one or more supplementary opening wall surfaces 766 thereof defining one or more supplementary openings 762 in the residual segment 769 (FIG. 9F). As an example, the supplementary opening 762 illustrated in FIG. 9F coincides with or includes the hole "$7J_1$".

A plug 768 bondable with the residual segment 769 is provided. The plug 768 is formed to at least partially fit into the supplementary opening 762. The plug 768 has a plug engagement surface 770 formed for engagement with the supplementary opening wall surface 766.

Preferably, one or more heating elements 724 is positioned in a preselected position relative to the plug engagement surface 770 and the supplementary opening wall surface 766 (FIG. 9F). A non-oxidizing (inert) atmosphere is provided that covers the plug, heating element, and the residual segment 769. It will be understood that a cover or container for holding the non-oxidizing atmosphere in place is omitted from the drawings, for clarity of illustration.

Next, the heating element 724 is energized. With the energized heating element, a residual segment heated portion 778 is heated to a hot working temperature, at which the residual segment heated portion 778 is plastically deformable. The residual segment heated portion 778 extends from the supplementary opening wall surface 766 into the residual segment 769.

With the energized heating element 724, a plug heated portion 779 is heated to the hot working temperature, at which the plug heated portion 779 is plastically deformable. The plug heated portion 779 extends from the plug engagement surface 770 into the plug 768. While the residual segment heated portion 778 and the plug heated portion 779 are at the hot working temperature, the plug 768 is subjected to an engagement motion, to move the plug engagement surface 770 relative to the supplementary opening wall surface 766.

The engagement motion may, for example, be rotation or oscillation of the plug 768 about its axis "7X" (FIG. 9F).

Next, while the plug 768 is subjected to the engagement motion, and while the residual segment heated portion 778 and the plug heated portion 779 are at the hot working temperature, additionally subjecting the plug 768 to a plug translocation motion, to push the plug 768 at least partially into the supplementary opening 762. The direction of the translocation motion is indicated by arrow "7D" in FIG. 9F.

Figure 9E:
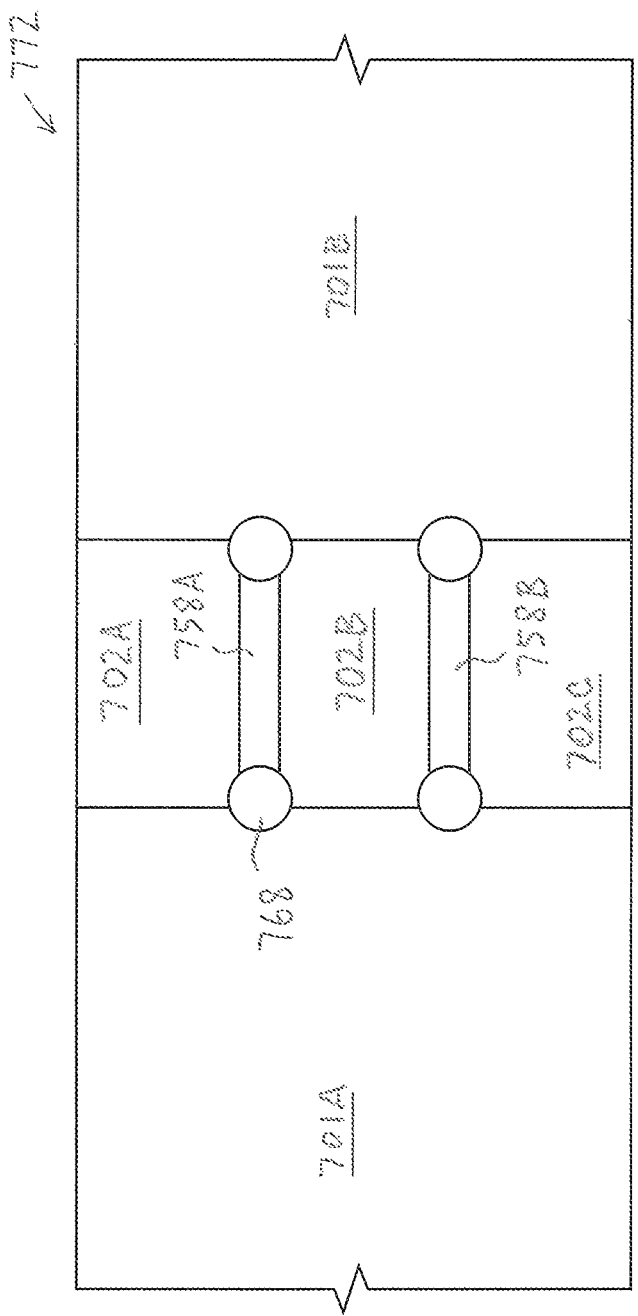
FIG. 9E is a side view of the incomplete workpiece of FIG. 9D in which plugs are inserted in the supplementary openings.

While the plug 768 is subjected to the engagement motion, and while the residual segment heated portion 778 and the plug heated portion 779 are at the hot working temperature, the plug engagement surface 770 is pressed against the supplementary opening wall surface 766, to cause plastic deformation of the residual segment heated portion 778 and the plug heated portion 779 for creating a metallic bond between the plug 768 and the residual segment 769. The direction in which the plug 768 is pressed is indicated by arrow "7G" in FIG. 9G. Finally, the plug 768 and the residual segment 769 are allowed to cool, to bond the plug 768 and the residual segment 769 together. Preferably, all the holes in the body 781 are filled in the same way, to produce a completed workpiece or structure 772 (FIG. 9E).

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A method of securing a plurality of plates together to form a structure, the method comprising the steps of:
    (a) securing at least two of the plates together to produce an intermediate segment of the structure having an initial opening therein, the intermediate segment comprising at least one opening wall at least partially around the initial opening, said at least one opening wall having at least one opening wall surface thereof partially defining the initial opening;
    (b) providing an insert metallically bondable with the intermediate segment, the insert being formed to at least partially fit into the initial opening, the insert having an insert engagement surface formed for engagement with said at least one opening wall surface;
    (c) positioning at least one heating element in a predetermined position relative to the insert engagement surface and to said at least one opening wall surface;
    (d) providing a non-oxidizing atmosphere covering the insert, said at least one heating element, and the intermediate segment;
    (e) energizing said at least one heating element;
    (f) with said at least one energized heating element, in the non-oxidizing atmosphere, heating an intermediate segment heated portion to a hot working temperature, the intermediate segment heated portion extending from said at least one opening wall surface into the intermediate segment, said intermediate segment heated portion being plastically deformable at the hot working temperature;
    (g) with said at least one energized heating element, in the non-oxidizing atmosphere, heating an insert heated portion extending from the insert engagement surface into the insert to the hot working temperature, said insert heated portion being plastically deformable at the hot working temperature;

(h) while the intermediate segment heated portion and the insert heated portion are at the hot working temperature, subjecting the insert to an insert engagement motion, to move the insert engagement surface relative to the opening wall surface;

(i) while the insert is subject to the engagement motion, and while said insert heated portion and said intermediate segment heated portion are at the hot working temperature, subjecting the insert to a translocation motion to push the insert at least partially into said initial opening;

(j) while the insert is subject to the engagement motion, and while said insert heated portion and said intermediate segment heated portion are at the hot working temperature, pressing the insert engagement surface against said at least one opening wall surface to cause plastic deformation of said intermediate segment heated portion and of said insert heated portion, for creating a metallic bond between the insert and the intermediate segment; and (k) allowing the insert and the intermediate segment to cool, to bond the insert and the intermediate segment together.

2. The method according to claim 1 in which the engagement motion is an oscillation.

3. The method according to claim 1 in which the intermediate segment and the insert form an incomplete workpiece comprising a body and at least one unfilled part of the initial opening.

4. The method according to claim 3 for completing the incomplete workpiece, the method additionally comprising the steps of:

(l) removing additional preselected material from at least one peripheral region of the body at least partially around said at least one unfilled part to form at least one supplementary opening wall, producing a residual segment of the body, said at least one supplementary opening wall comprising at least one supplementary opening wall surface thereof defining at least one supplementary opening in the residual segment, said at least one supplementary opening comprising said at least one unfilled part;

(m) providing at least one plug that is metallically bondable with the residual segment, said at least one plug being formed to at least partially fit into said at least one supplementary opening, said at least one plug having a plug engagement surface formed for engagement with said at least one supplementary opening wall surface;

(n) providing a non-oxidizing atmosphere covering said at least one plug, said at least one heating element, and the residual segment;

(o) positioning said at least one heating element in a preselected position relative to the plug engagement surface and to said at least one supplementary opening wall surface;

(p) energizing said at least one heating element;

(q) with said at least one energized heating element, in the non-oxidizing atmosphere, heating a residual segment heated portion to the hot working temperature, the residual segment heated portion extending from said at least one supplementary opening wall surface into the residual segment, said residual segment heated portion being plastically deformable at the hot working temperature;

(r) with said at least one energized heating element, in the non-oxidizing atmosphere, heating a plug heated portion to the hot working temperature, the plug heated portion extending from the plug engagement surface into said at least one plug, said at least one plug heated portion being plastically deformable at the hot working temperature;

(s) while the residual segment heated portion and the plug heated portion are at the hot working temperature, subjecting said at least one plug to a secondary engagement motion, to move the plug engagement surface relative to said at least one supplementary opening wall surface;

(t) while said at least one plug is subjected to the secondary engagement motion, and while the residual segment heated portion and the plug heated portion are at the hot working temperature, additionally subjecting said at least one plug to a plug translocation motion to push said at least one plug at least partially into said at least one supplementary opening;

(u) while said at least one plug is subject to the secondary engagement motion, and while said residual segment heated portion and the plug heated portion are at the hot working temperature, pressing the plug engagement surface against said at least one supplementary opening wall surface, to cause plastic deformation of the residual segment heated portion and the plug heated portion for creating a metallic bond between said at least one plug and the residual segment; and (v) allowing the plug and the residual segment to cool, to bond the plug and the residual segment together.

5. The method according to claim 4 in which the secondary engagement motion is an oscillation.

* * * * *